(12) United States Patent
Sgourakes

(10) Patent No.: US 6,321,585 B2
(45) Date of Patent: Nov. 27, 2001

(54) DIFFERENTIAL PRESSURE GENERATOR

(75) Inventor: George E. Sgourakes, Millis, MA (US)

(73) Assignee: AVGI Engineering, Inc., Millis, MA (US)

( * ) Notice: Subject to any disclaimer, the term of this patent is extended or adjusted under 35 U.S.C. 154(b) by 0 days.

(21) Appl. No.: 09/811,036

(22) Filed: Mar. 16, 2001

Related U.S. Application Data

(63) Continuation-in-part of application No. 09/545,583, filed on Apr. 7, 2000.

(51) Int. Cl.⁷ .................................................. G01L 27/00
(52) U.S. Cl. .................................................. 73/1.68
(58) Field of Search ..................... 73/1.57, 1.65, 73/1.68, 1.69; 417/211, 244, 245, 328, 460, 469; 92/110, 112, 117 R, 117 A

(56) References Cited

U.S. PATENT DOCUMENTS

| | | |
|---|---|---|
| 2,433,812 * | 12/1947 | Hastings, Jr. et al. .............. 417/460 |
| 3,106,084 | 10/1963 | Hoffman et al. . |
| 3,407,644 | 10/1968 | Yasunami . |
| 3,630,071 * | 12/1971 | Newhall ................................ 73/1.65 |
| 3,696,659 | 10/1972 | Lawford . |
| 4,604,891 | 8/1986 | Sgourakes et al. . |
| 4,638,656 | 1/1987 | Sgourakes . |
| 4,708,010 | 11/1987 | Sgourakes . |
| 4,776,201 | 10/1988 | Jones . |
| 4,909,063 | 3/1990 | Olsen . |
| 5,065,611 | 11/1991 | Angelosanto et al. . |
| 5,345,807 | 9/1994 | Butts et al. . |
| 5,402,666 | 4/1995 | Chalpin . |
| 5,461,901 | 10/1995 | Ottestad . |

FOREIGN PATENT DOCUMENTS 762437  11/1956  (GB) .

OTHER PUBLICATIONS

Second College Editin The American Heritage Dictionary, copy of definition of the word "fall", Haughton Mifflin Co, 1982.*

* cited by examiner

Primary Examiner—Robert Raevis
(74) Attorney, Agent, or Firm—John L. Lee

(57) ABSTRACT

Differential pressure generator 100 includes a stacked pair of opposed novel gravity transducers of the inverted-cup falling-cylinder type. First enclosure 21 contains a first gravity transducer 23 and second enclosure 31 contains a second gravity transducer 33. First gravity transducer 23 includes first cylinder 24, and first piston 25. The first cylinder is mounted for gravity-driven, viscosity-limited motion with respect to the first piston to generate a first pressure difference. The second gravity transducer includes a second cylinder and a second piston. The second cylinder is mounted for gravity-driven, viscosity-limited motion with respect to the second piston to generate a second pressure difference. The first cylinder has a displacement volume that is equal to the displacement volume of the second cylinder, and the first cylinder is heavier than the second cylinder. The first pressure difference and the second pressure difference are summed in opposition to produce a reference differential pressure.

27 Claims, 26 Drawing Sheets

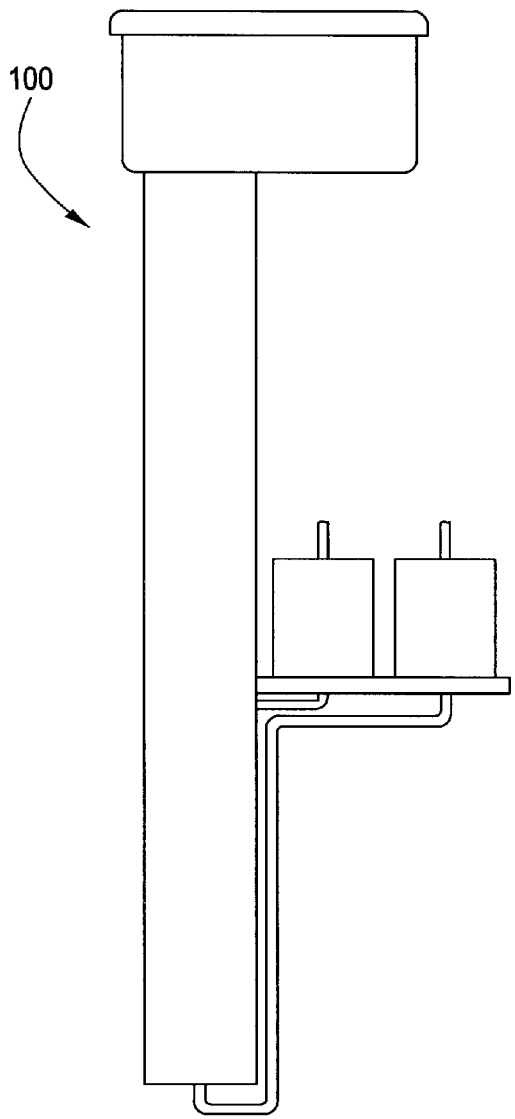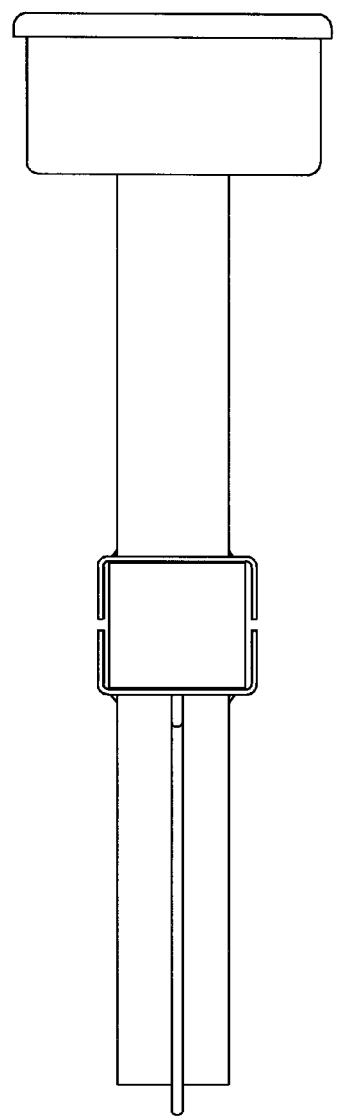
FIG. 4A  FIG. 4B
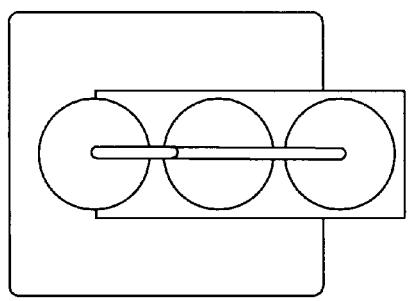
FIG. 4C

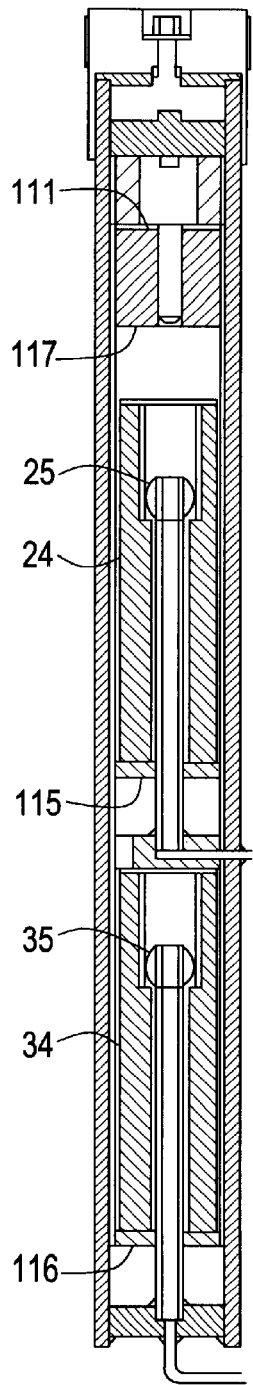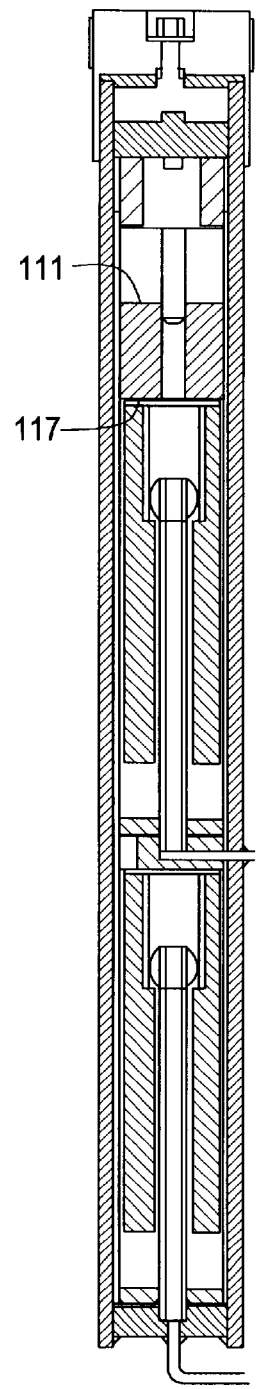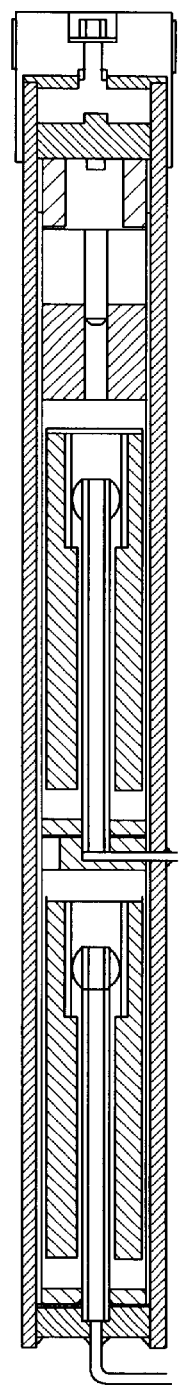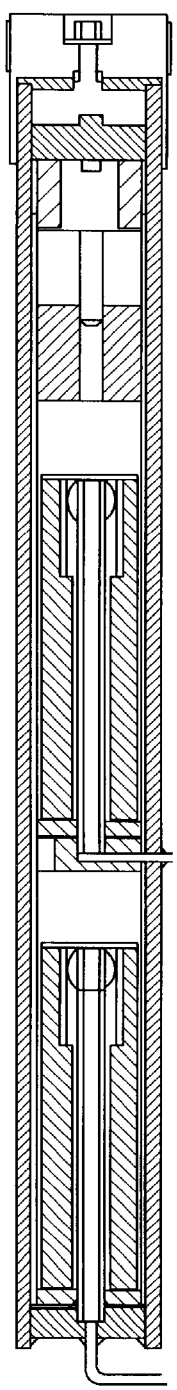
*FIG. 8A*  *FIG. 8B*  *FIG. 8C*  *FIG. 8D*

SECTION A-A

SECTION A-A

SECTION A-A

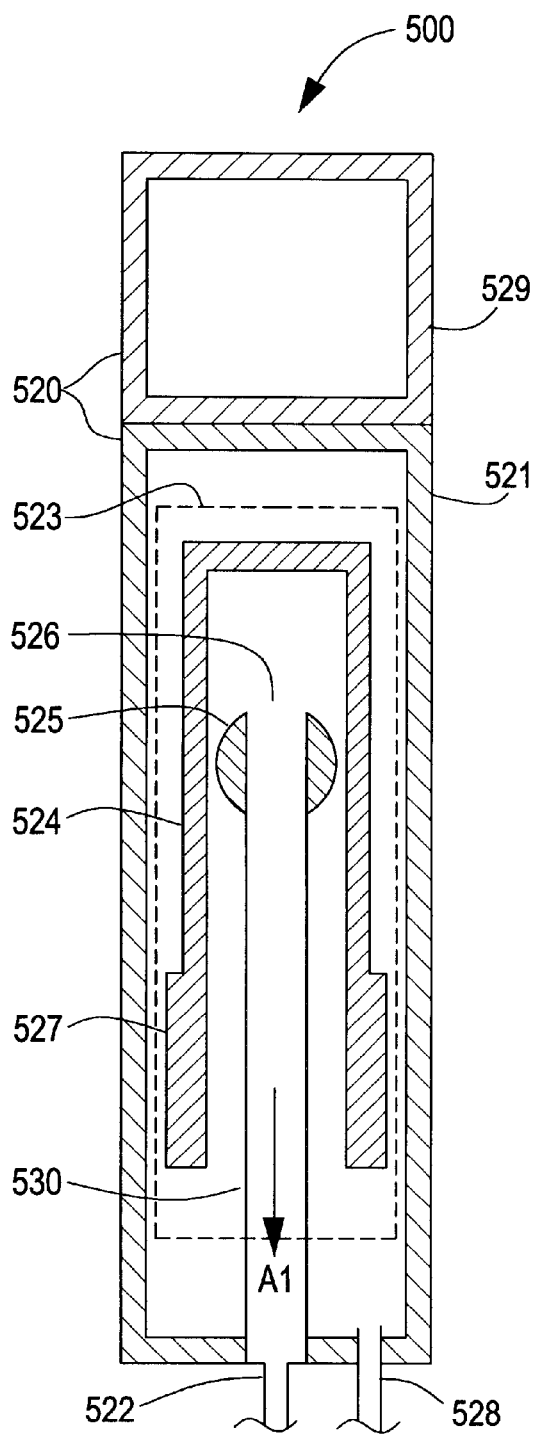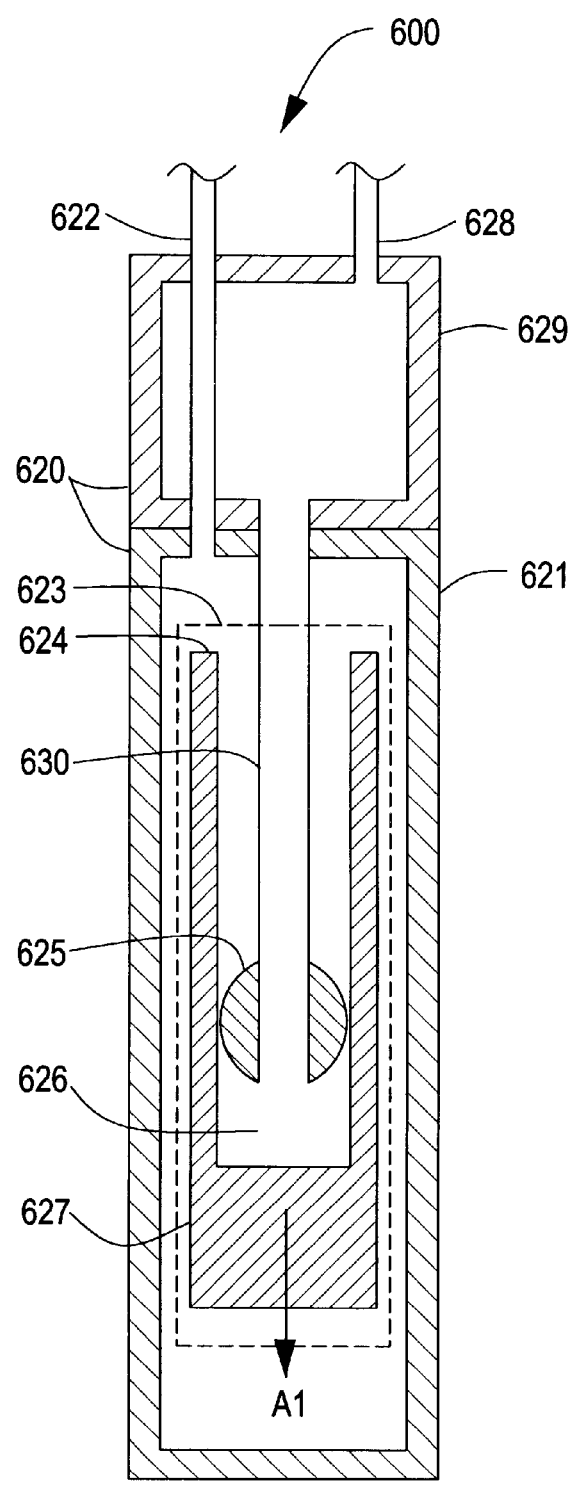
*FIG. 25*    *FIG. 26*

DIFFERENTIAL PRESSURE GENERATOR

This application is a C-I-P of co-pending U.S. application Ser. No. 09/545,583, filed Apr. 7, 2000.

TECHNICAL FIELD

This invention relates generally to methods and apparatus for generating a reference differential pressure. Also, this invention relates to improvements in means for monitoring and calibrating a conventional differential pressure sensor measuring across a conventional orifice plate in a process flow line or a differential pressure sensor of a liquid-level measurement in a tank.

BACKGROUND OF THE INVENTION

In U.S. Pat. No. 4,638,656, issued Aug. 12, 1986, in which the inventor of the present invention is a co-inventor, there is shown a pressure measuring instrument having means for monitoring the span calibration so that such calibration can be reset as necessary. This span calibration means comprises a reference pressure device for developing and applying to the instrument a reference pressure of precisely-controlled magnitude. In the preferred embodiment, the device includes a vertically-oriented cylindrical tube containing a fill-liquid which communicates with fill-liquid in the instrument. A solid metal ball in the tube can be raised to the top of the tube (as by an externally-developed magnetic field) and then released. The ball drops under the force of gravity through the fill-liquid to produce a pressure of essentially constant magnitude over much of the drop distance. This pressure is used as a reference pressure for setting the span calibration of the instrument, as by adjusting electronic circuitry forming part of the instrument, or located remotely from the instrument.

The "dropping ball" reference pressure device of U.S. Pat. No. 4,638,656 makes possible remote zero and span calibration of a pressure measuring instrument while the instrument is "in situ". The instrument is considered to be "in situ" when the instrument is mounted to the plant or pipeline under static process pressure condition and exposed to ambient temperatures and process temperatures, and other conditions of the plant or pipeline.

However, the accuracy of the calibration depends on both the reference pressure device and the pressure-measuring instrument being insensitive to temperature and static pressure. The "dropping ball" reference pressure device of U.S. Pat. No. 4,638,656 is sensitive to temperature and pressure because changes in temperature and pressure affect the specific weight of the fluid in the device, and change in specific weight affects the developed reference pressure.

More specifically, the "dropping ball" reference pressure device is an integral part of the instrument and is enclosed in silicone oil and is significantly influenced by changes in the buoyant force acting on the "dropping ball" caused by changes in process pressure and process temperature. The specific weight of the silicone oil changes by approximately 0.5% per 6.8 kPa (1000 psi) change in process pressure. The specific weight of the silicone oil also changes by approximately 5% per 55 degrees Celsius (100 degrees Fahrenheit) change in process temperature. To compensate for such changes, the process temperature and process pressure is measured and used to calculate the specific weight of the silicone oil. Then the calculated specific weight is used to correct the reference pressure. If not corrected, a change temperature as small as 5.5 degrees Celsius (10 degrees Fahrenheit) will produce a 0.5% error. Furthermore, because the "dropping ball" reference pressure device is an integral part of the instrument, the instrument contains a significantly higher volume of fill fluid than a comparable instrument without a "dropping ball" device. So changes in volume cause a correspondingly greater deflection of seal diaphragms. This results in a correspondingly greater sensitivity to temperature and pressure changes.

There is therefore, a need for a reference pressure device that is insensitive to temperature, static pressure and other sources of error.

SUMMARY OF THE INVENTION

The present invention provides a differential pressure generator that is insensitive to temperature and static pressure. A preferred embodiment uses a novel configuration of opposed novel gravity transducers to significantly reduce sensitivity to temperature, to static pressure and, within limits, to vertical misalignment.

In a preferred embodiment, the invention provides a differential pressure generator including a first enclosure containing a first gravity transducer and a second enclosure containing a second gravity transducer. The first gravity transducer includes two first components, one component, a cylinder, mounted for gravity-driven, viscosity-limited motion with respect to the other, a piston, such as to generate a first pressure difference. The second gravity transducer includes two second components, one component, a cylinder, mounted for gravity-driven, viscosity-limited motion with respect to the other, a piston, such as to generate a second pressure difference. The preferred embodiment also includes summing means for summing in opposition the first pressure difference and the second pressure difference to produce an output differential pressure.

In another embodiment, the invention provides a differential pressure generator including a fluid-filled enclosure, a piston mounted within the enclosure, and a cylinder located in the enclosure surrounding the piston. The cylinder is mounted for falling in a gravity-driven motion relative to the piston. A pair of output conduits is pressure-coupled to output a pressure difference produced across the piston when the cylinder is falling.

BRIEF DESCRIPTION OF THE DRAWINGS

FIGS. 4A, 4B and 4C are front elevation view, side elevation view, and bottom view, respectively, of the embodiment of FIG. 1.

FIGS. 8A, 8B, 8C and 8D show the falling cylinders of the embodiment of FIG. 1, in successive positions during vertical translation.

FIG. 25 is a schematic front view of a fifth embodiment of a differential pressure generator according to the present invention, using a single novel gravity transducer of the inverted-cup falling-cylinder type.

FIG. 26 is a schematic front view of a sixth embodiment of a differential pressure generator according to the present invention, using a single novel gravity transducer of the upright-cup falling-cylinder type.

DETAILED DESCRIPTION OF THE INVENTION

A differential pressure generator according to the present invention produces a reference differential pressure of predetermined magnitude in the presence of an arbitrary static pressure, or in the presence an arbitrary temperature. In a first preferred embodiment, illustrated in FIG. 1, the differential pressure generator uses a stacked pair of opposed novel gravity transducers of the inverted-cup falling-cylinder type, to produce a reference differential pressure.

Figure 1:
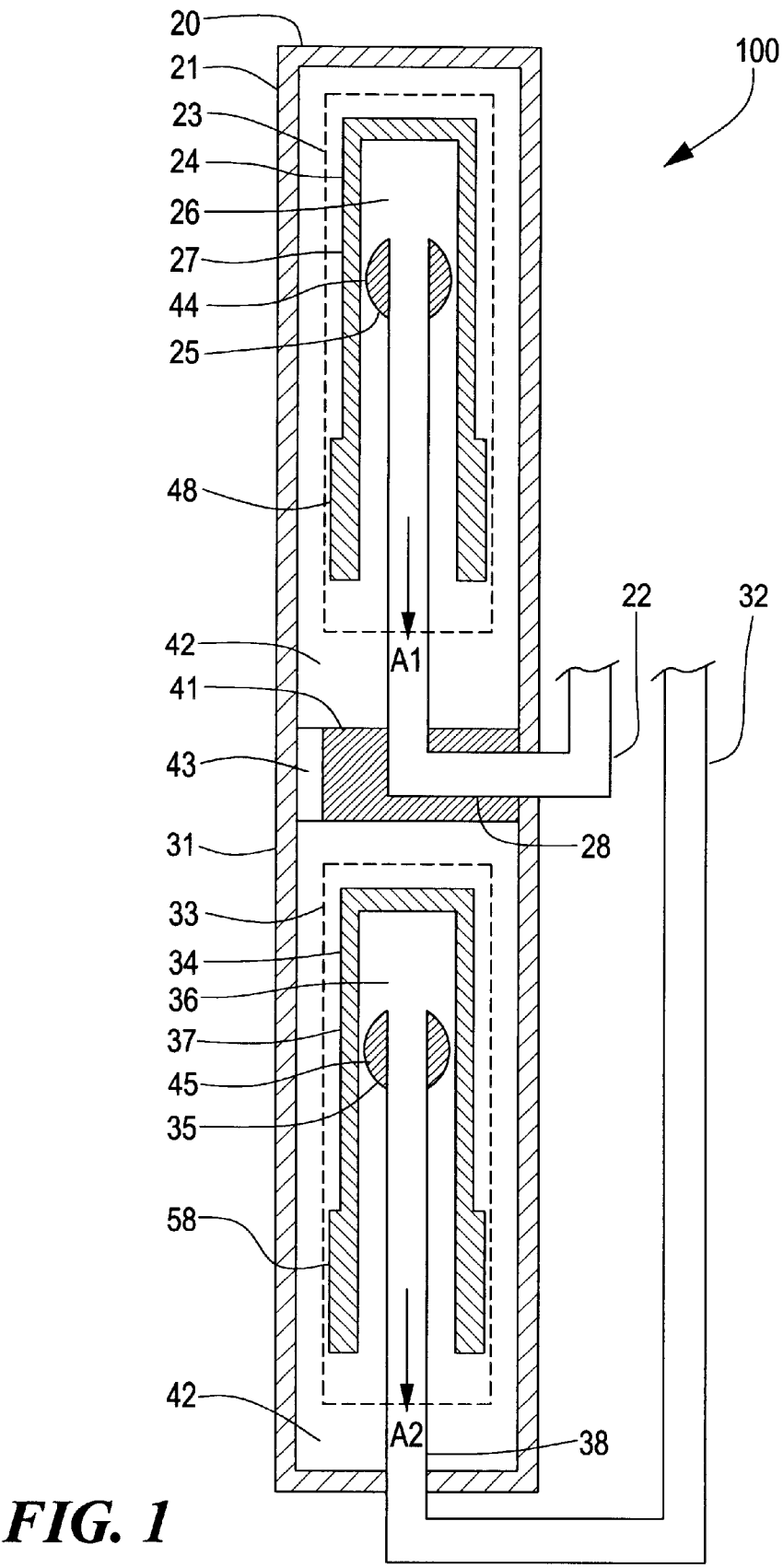
FIG. 1 is a schematic front view of a first preferred embodiment of a differential pressure generator according to the present invention, using a stacked pair of opposed novel gravity transducers of the inverted-cup falling-cylinder type.

FIG. 1 is a schematic front view of the first preferred embodiment. This first preferred embodiment of differential pressure generator 100 includes housing 20 defining first enclosure 21 and second enclosure 31. Differential pressure output is presented across first output conduit 22 and second output conduit 32. A first gravity transducer 23 is suspended in fluid within the first enclosure. A second gravity transducer 33 is suspended in fluid within the second enclosure.

The term "gravity transducer", as used herein, refers to a system for transforming energy in one form to energy in another form, specifically gravity to pressure. Since the gravitational constant is known with high accuracy at any point on the earth, this provides a basis for generating a differential pressure that is known with high accuracy. A transducer of this type is known from U.S. Pat. No. 5,065,611, issued Nov. 19, 1991. The inventor of the present invention is a co-inventor of the '611 patent. The '611 patent refers to "a reference pressure device of the dropping-ball type". The term "gravity transducer" is not used in the '611 patent.

The first preferred embodiment of the present invention is a differential pressure generator using a stacked pair of opposed novel gravity transducers of the inverted-cup falling-cylinder type. The first preferred embodiment is shown in FIGS. 1–9.

Figure 10:
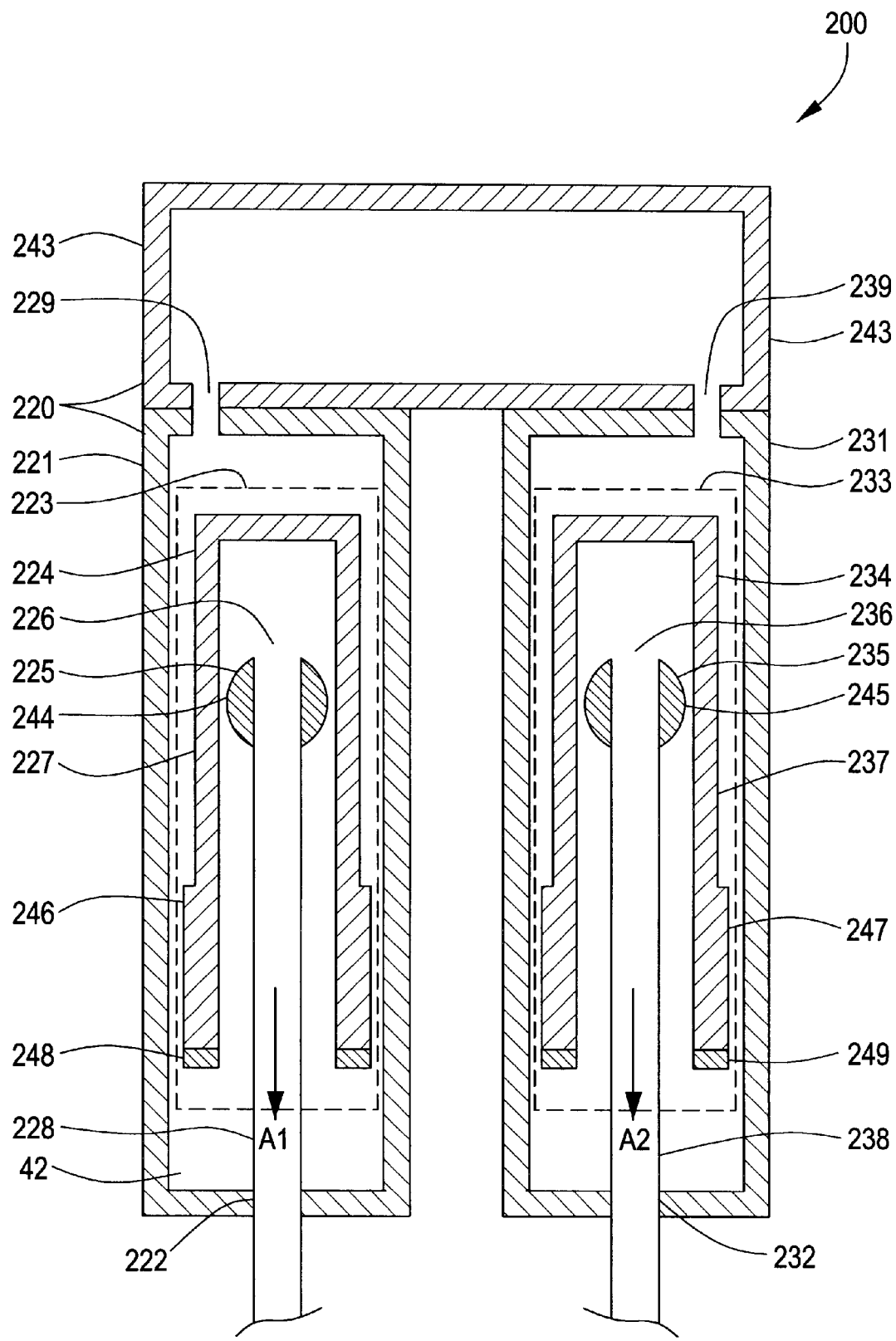
FIG. 10 is a schematic front view of a second embodiment of a differential pressure generator according to the present invention, using side-by side opposed novel gravity transducers of the inverted-cup falling-cylinder type.

A second embodiment is a differential pressure generator using a side-by-side pair of opposed novel gravity transducers of the inverted-cup falling-cylinder type. The second embodiment is shown in FIG. 10.

A third embodiment is a differential pressure generator using a side-by-side pair of opposed novel gravity transducers of the upright-cup falling-cylinder type. The third embodiment is shown in FIGS. 11–15.

A fourth embodiment is a differential pressure generator using a side-by-side pair of opposed gravity transducers of the falling-piston type. The fourth embodiment is shown in FIGS. 16–24. Herein below, the term "transducer of the falling-piston type" should be understood to include a transducer of "the falling-ball type".

A fifth embodiment is a differential pressure generator using a single novel gravity transducer of the inverted-cup falling-cylinder type. The fifth embodiment is shown in FIG. 25.

A sixth embodiment is a differential pressure generator using a single novel gravity transducer of the upright-cup falling-cylinder type. The sixth embodiment is shown in FIG. 26.

A gravity transducer, as this term is used herein, includes a cylinder component and a piston component mounted for gravity-driven, viscosity-limited, motion relative to one another, one of the components, the cylinder component or the piston component, being the falling component.

Six embodiments of differential pressure generator are disclosed herein. All six include at least one gravity transducer. In all six embodiments the gravity transducer includes a pair of components consisting of one falling component and one fixed component, the pair mounted for gravity-driven, viscosity-limited motion of the falling component with respect to the fixed component. Four of the six embodiments, embodiments, embodiments 1–4, comprise two such gravity transducers coupled in opposition. The other two embodiments, embodiments 5–6, each comprise one gravity transducer wherein the falling component is a cylinder and the fixed component is a piston.

Details of the fourth embodiment were disclosed in the parent application of the present application. The parent application is U.S. application Ser. No. 09/545,583, filed Apr. 7, 2000. U.S. application Ser. No. 09/545,583 is hereby incorporated herein by reference.

First Preferred Embodiment

FIG. 1 is a schematic front view of the first preferred embodiment using opposed novel gravity transducers of the inverted-cup falling-cylinder type.

First gravity transducer 23 of FIG. 1 includes first cylinder 24 (the first falling component) and first piston 25. Cylinder 24 is closed at its upper end. Piston 25 and the internal closed end of cylinder 24 define first chamber 26. Fluid 42 fills first enclosure 21 and surrounds piston 25. Likewise, second gravity transducer 33 includes second cylinder 34 (the second falling component) and second piston 35. Cylinder 34 is closed at its upper end. Piston 35 and the internal closed end of cylinder 34 define second chamber 36. Fluid 42 fills second enclosure 31 and surrounds second piston 35. Fluid 42 also passes freely via conduit 43 between enclosures 21 and 31.

First output conduit 22 is pressure-coupled to first chamber 26. First enclosure 21 is pressure-coupled to second enclosure 31 via conduit 43 passing through base plate 41. Second chamber 36 is pressure-coupled to second output conduit 32. Each of first chamber conduit 28 and second chamber conduit 38 is formed as a hollow interior of respective first and second piston support pillar.

In the first preferred embodiment, as shown in FIG. 1, first cylinder 24 includes first body 27, and second cylinder 34 includes second body 37. First body 27 has the same dimensions and the same displacement volume as second body 37. However, the material of which first body 27 is made, is more dense than the material of which second body 37 is made. Accordingly, by design, first cylinder 24 has the same displacement volume as second cylinder 34, but is heavier than second cylinder 34.

To achieve a useful range, each body includes a large-volume weight portion at its lower end. First body 27 includes first large-volume weight portion 48. Second body includes second large-volume weight portion 58. The large-volume weight portions are shown in FIG. 1 as portion 48 in first cylinder 24, and as portion 58 in second cylinder 34.

A lifter (not shown in FIG. 1) is coupled to lift and release both cylinders simultaneously, so that the two cylinders fall simultaneously.

The first cylinder falling, as indicated by arrow A1 in FIG. 1, in viscosity-limited relationship with the first piston, develops a first pressure above the first piston (i.e., at output conduit 22) that is higher than the pressure below the first piston (i.e., in conduit 43). Likewise, the second cylinder falling, as indicated by arrow A2 in FIG. 1, in viscosity-limited relationship with the second piston, develops a second pressure above the second piston (i.e., at output conduit 32) that is higher than the pressure below the second piston (i.e., in conduit 43). The two cylinders have the same volume but the first cylinder is heavier than the second cylinder so the first cylinder develops a pressure difference across the first piston than is greater than the corresponding pressure difference across the second piston. The pressure-coupling of first enclosure 21 to second enclosure 31 via conduit 43 holds both enclosures at the same pressure. So when the two cylinders fall simultaneously, the sum of the pressure difference across the first piston and the opposed pressure difference across the second piston appears across output conduit 22 and output conduit 32, the output pressure at conduit 22 being higher than the output pressure at conduit 32. The pressure difference across conduits 22 and 32 is the reference differential pressure.

Thus, because the first gravity transducer has a heavier cylinder than the second gravity transducer, causing the output pressure at conduit 22 to be higher than the output pressure at conduit 32, the first gravity transducer is the "high gravity transducer" and the second side is the "low gravity transducer".

The use of a pair of gravity transducers coupled in opposition, and the use of two falling cylinders that have the same volume but different specific weight, makes the reference differential pressure produced by the generator substantially independent of fluid specific weight. The reference differential pressure so generated can be used to calibrate, accurately and reproducibly, the span of a differential pressure sensor that is located on a process line and subjected to process static pressure and process temperature, or in a tank farm and subjected to outdoor ambient temperature.

Figure 2:
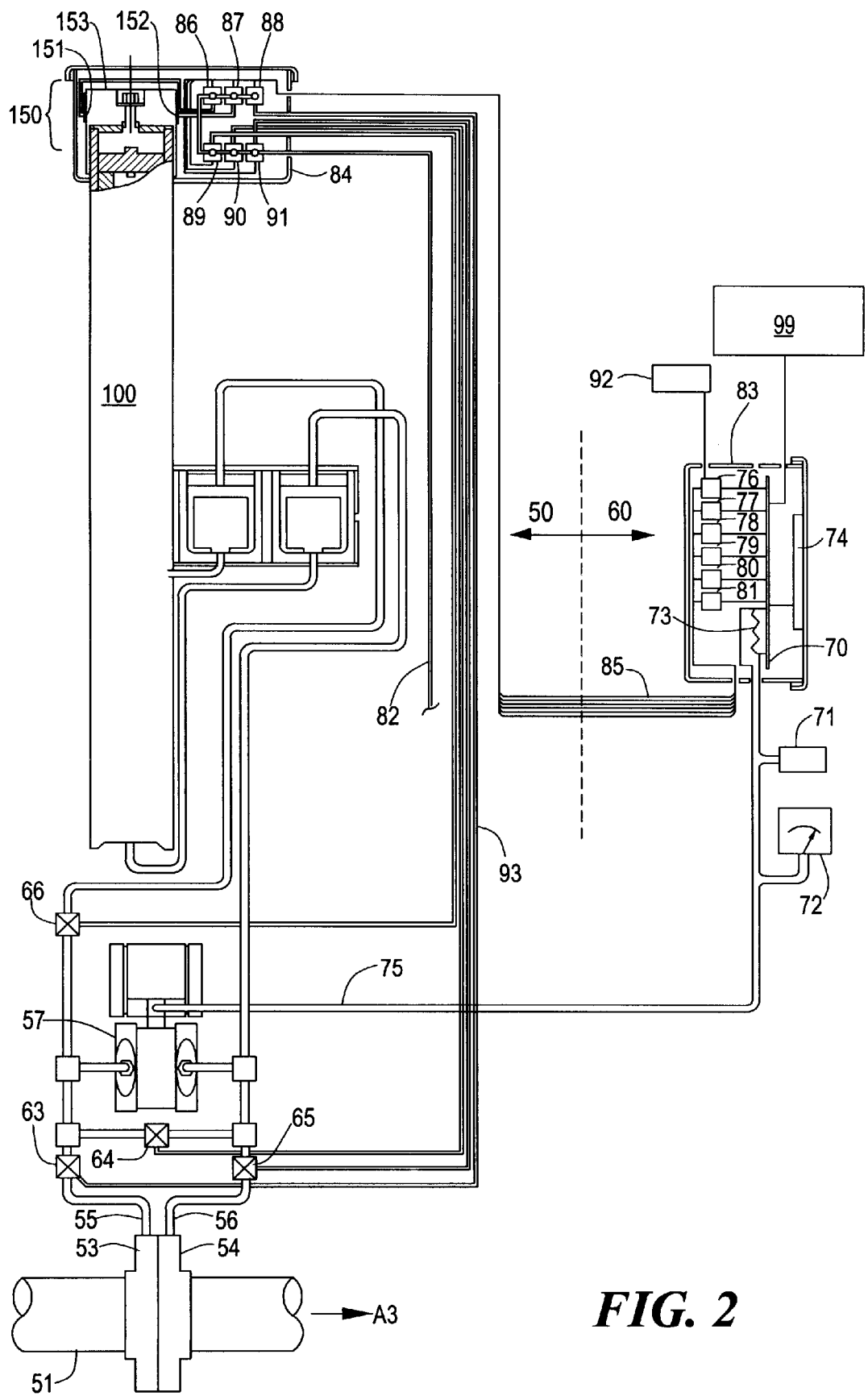
FIG. 2 is a schematic front view of a differential pressure flow measuring system configured for in-situ calibration using the differential pressure generator of FIG. 1.

FIG. 2 is a schematic front view of a differential pressure flow measuring system configured for on-line calibration using the differential pressure generator of FIG. 1. It displays the key components, some in process area 50, others in control room 60. Arrow A3 in FIG. 2 represents process fluid flow direction from left to right. Flow in process pipe 51 through an orifice plate (not shown), between upstream flange 53 and downstream flange 54, produces a pressure difference that is measured across upstream tap 55 and downstream tap 56 by conventional differential pressure transmitter ("d/p cell") 57. Since flow direction is from left to right, the left side (the high side) is at a slightly higher pressure than the right side (the low side).

When differential pressure generator 100 is mounted for calibration of a d/p cell, the high side of the generator (first output conduit 22) is coupled to the "high side", and the low side of the generator (second output conduit 32) is coupled to the "low side", as shown in FIG. 2.

Intrinsically-Safe, Electro-Pneumatic Lifter Control

Calibration of a conventional differential pressure sensor by an embodiment of the present invention is typically performed with the sensor in situ and under process conditions with the sensor temporarily isolated, i.e. off-line. In a preferred use of the invention, calibration is controlled from the control room. FIG. 2 shows a first preferred embodiment 100 connected to a nearby differential pressure transmitter 57, both located in process area 50. Electronic control and display equipment is shown in a calibration control display located in control room 60. Differential pressure transmitter 57 is connected by intrinsically safe electrical signal cable 75 to first intrinsically safe power supply 71, indicator 72, and resistor 73, all located in the control room. Calibration control housing 83 contains data acquisition controller 70, calibration control display 74, resistor 73, and six optically isolated electrical switches 76–81. Resistor 73 produces a voltage drop indicative of the electrical output signal of the differential pressure transmitter. Optically isolated electrical switches 76–81 are connected via intrinsically safe electrical solenoid-drive cable 85 to operate solenoid-driven pneumatic valves 86–91, mounted in solenoid valve and pneumatic turbine housing 84. Switches 76–81 are powered by second intrinsically safe power supply 92. Solenoid valves 88–91 apply pressure to operate calibrator isolation valves 63–66. During data acquisition in calibration, the voltage across resistor 73 is monitored during the falling of the cylinders of the differential pressure generator. Solenoids 86 and 87 apply pressure to pneumatic turbine 150 in one direction to raise the cylinders, or in the opposite direction to drop the cylinders. Calibration control display 74 is preferably a liquid crystal display.

Remote control and display of calibration may be provided via data link 99.

Figure 3:
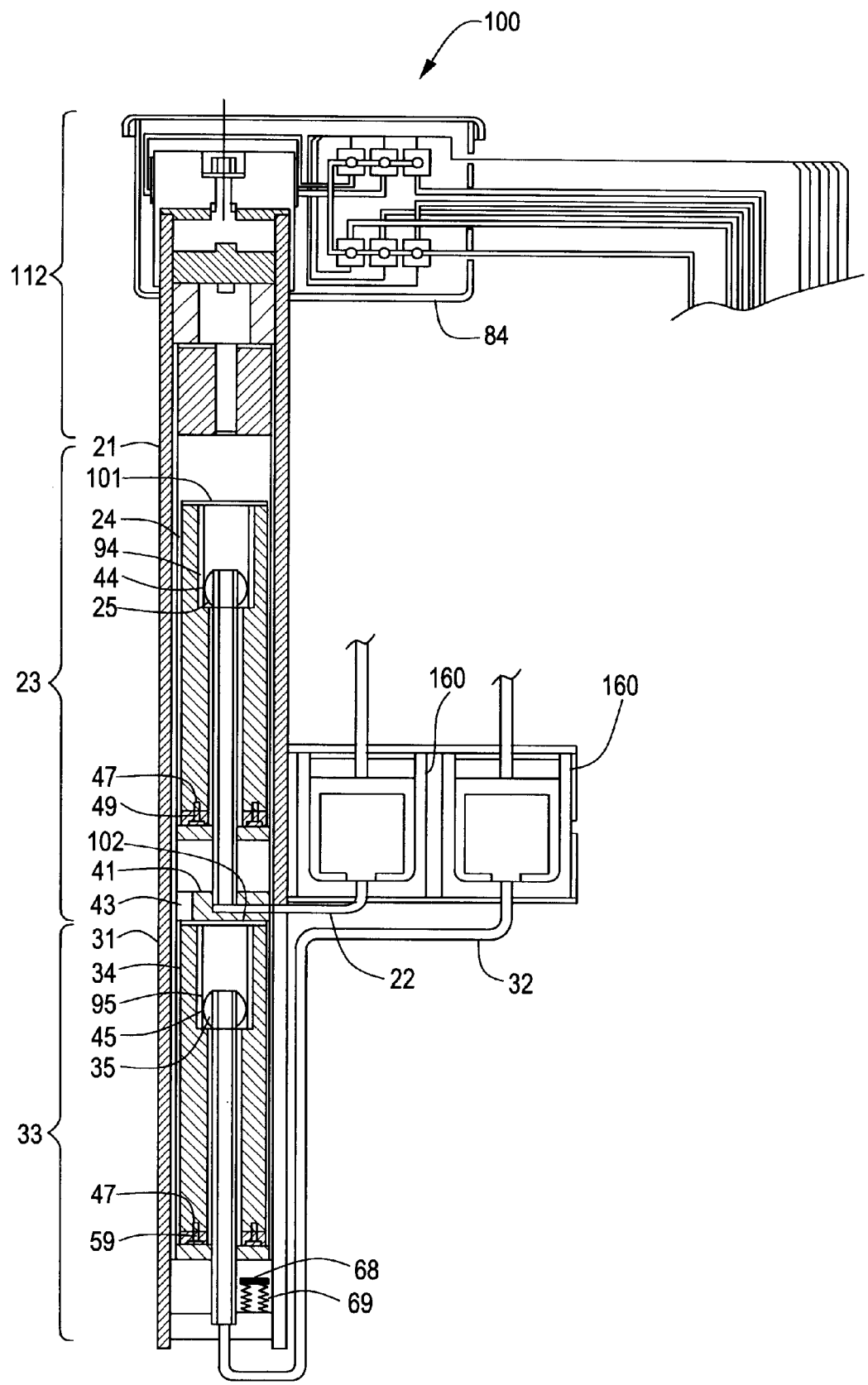
FIG. 3 is a sectioned view of the embodiment of FIG. 1.

FIG. 3 is a sectioned view of the embodiment of FIG. 1, giving detail of the construction of the first preferred embodiment. Note the five main physical sub-assemblies of the first preferred embodiment are: first transducer 23, second transducer 33, drive motor assembly 112 of the lifter, solenoid valve and pneumatic turbine housing 84, and the two process isolators 160.

Figure 5A:
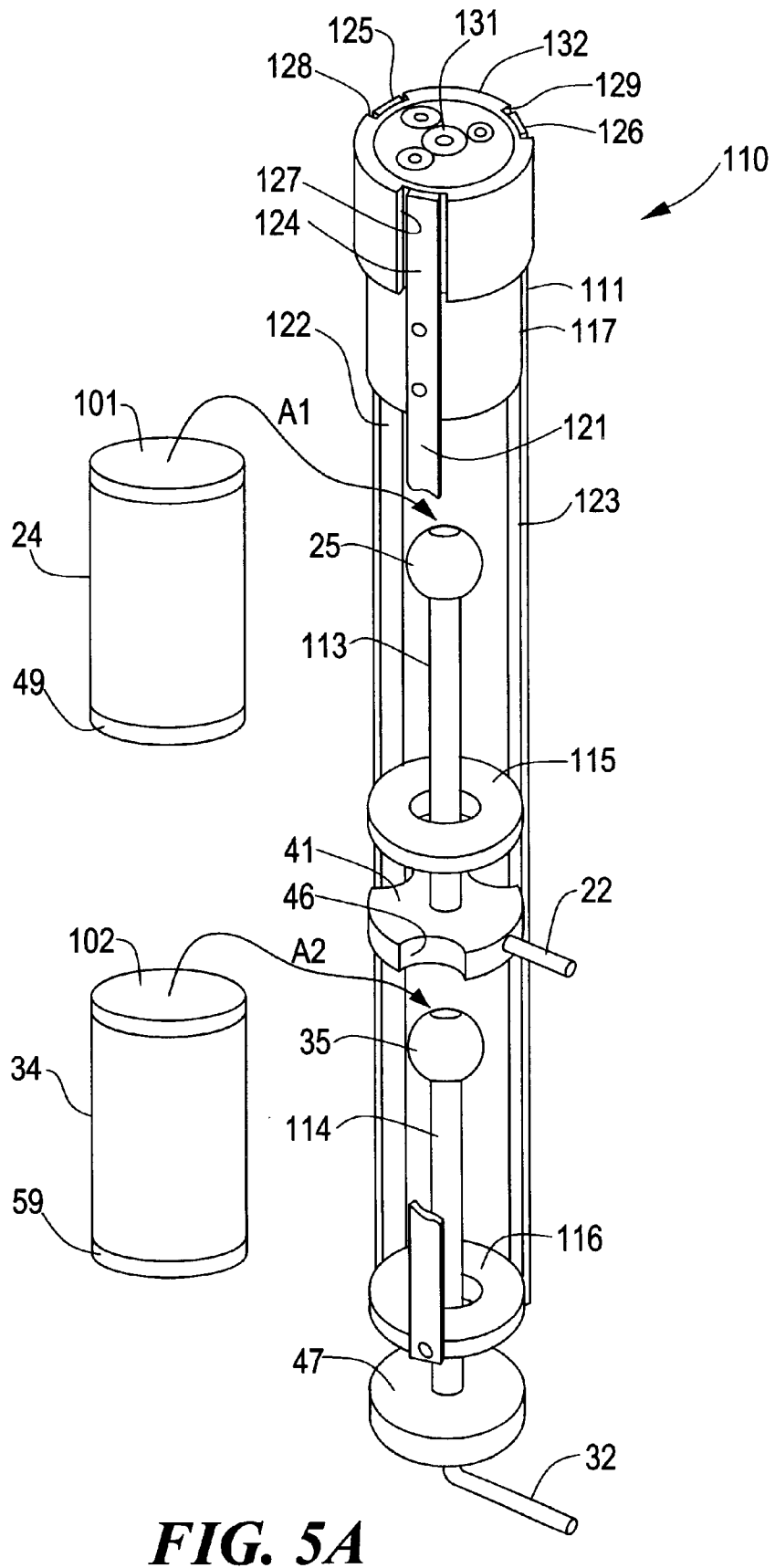
FIG. 5A is a cut-away perspective view of the lifter and its carriage assembly.

FIG. 3 shows first cylinder 24 having first closed top 101 and second cylinder 34 having second closed top 102. First output conduit 22 and second output conduit 32 are, by design, both at the same elevation to eliminate error due to head of fill-fluid. Flow source device 68 with bellows 69 is located at the bottom of second enclosure 31. FIG. 3 also locates conduit 43. FIG. 5A shows how conduit 43 is formed as slots 46 passing through base plate 41.

Lifter

The lifter of the generator of FIG. 1, includes an elongated carriage assembly that lifts and drops first and second cylinders, and a drive motor assembly that drives the carriage assembly up and down under control of signals received, typically from a controller located in a control room.

FIG. 5A is a cut-away perspective front view of lifter 110 and its elongated carriage assembly 111. Housing 20 and enclosures 21 and 31 are not shown, and the two cylinders are moved to one side, to reveal the interior components.

Each piston is attached to the top of a hollow support pillar. First piston 25 is supported by first pillar 113. Pillar 113 is supported by first base plate 41. Likewise, second piston 35 is supported by second pillar 114. The second pillar is attached to and supported by second base plate 47 at the bottom of the second enclosure.

Arrow A1 indicates how first cylinder 24 fits over first piston 25. Likewise, arrow A2 indicates how second cylinder 34 fits over second piston 35.

Elongated carriage assembly 111 includes first annular platform 115, second annular platform 116, and translation block 117 attached together by three rigid metal straps 121–123. The carriage assembly translates vertically and is restrained from rotating with respect to the pistons and the drive motor assembly. When the lifter is lifting the cylinders, first and second cylinders are lifted up on first and second platforms, respectively.

Figure 5B:
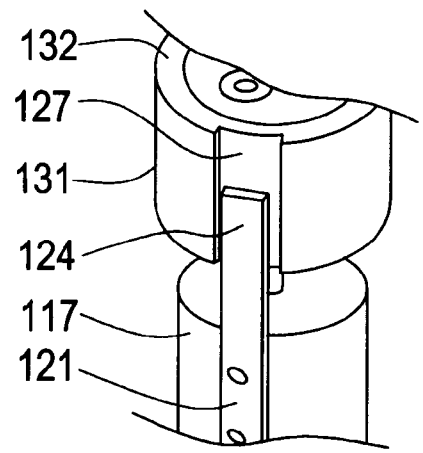
FIG. 5B shows the anti-rotation slide mechanism of the lifter.

FIG. 5B shows the anti-rotation slide mechanism of the lifter. As shown in FIG. 5A, each of straps 121–123 includes an anti-rotation slide bar portion, 124–126, respectively. The slide bar portions ride in corresponding guide slots, 127–129, cut into enclosure 132 of planetary gear train 131 so as to prevent rotation of the carriage assembly with respect to the planetary gear train, the drive motor assembly, and the transducers. FIG. 5B shows a downward displacement of carriage assembly 111 with respect to planetary gear train 131, and operation of the slide bar portions.

Figure 5C:
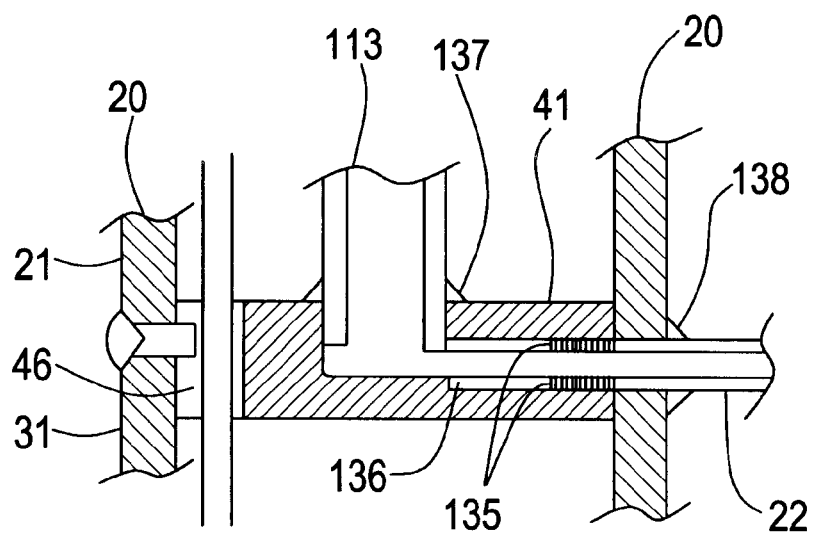
FIG. 5C shows construction detail of the output conduit and the piston support pillar of the embodiment of FIG. 1.

FIG. 5C shows construction detail of the connection of output conduit 22 to the hollow interior of first pillar 113. First pillar 113 is welded into base plate 41 by weld 137. First piston assembly, including first pillar 113 welded to base plate 41, is inserted into housing 20, with brazing compound pre-positioned in passage 136. Conduit 22 is inserted into passage 136 and brazed to produce brazed seal 135. Then conduit 22 is welded to housing 20 by weld 138. First base plate 41 is pin-welded to housing 20.

Figure 6A:
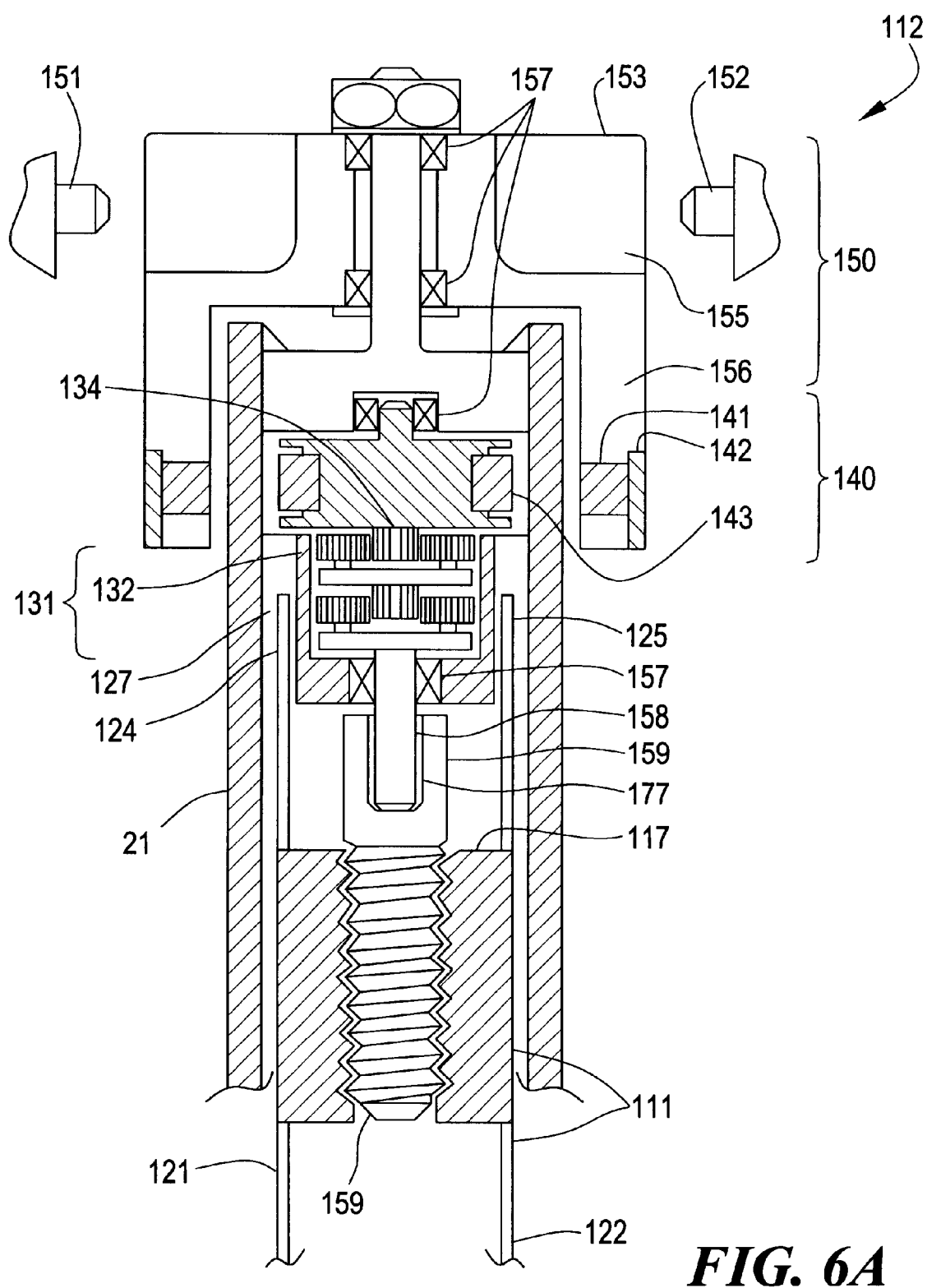
FIG. 6A is a partial cut-away view of the lifter drive motor assembly.

FIG. 6A shows drive motor assembly 112. The drive motor assembly includes pneumatic turbine 150 with impeller 153, outer drive magnets 141, magnetic coupler 140, planetary gear train 131, output shaft 158, and translation screw 159. Output shaft 158 is brazed to translation screw 159 by braze 177. Impeller 153 is a molded plastic part having a blade portion 155 and a cylindrical output end portion 156. The impeller turns on bearings 157.

Figure 7:
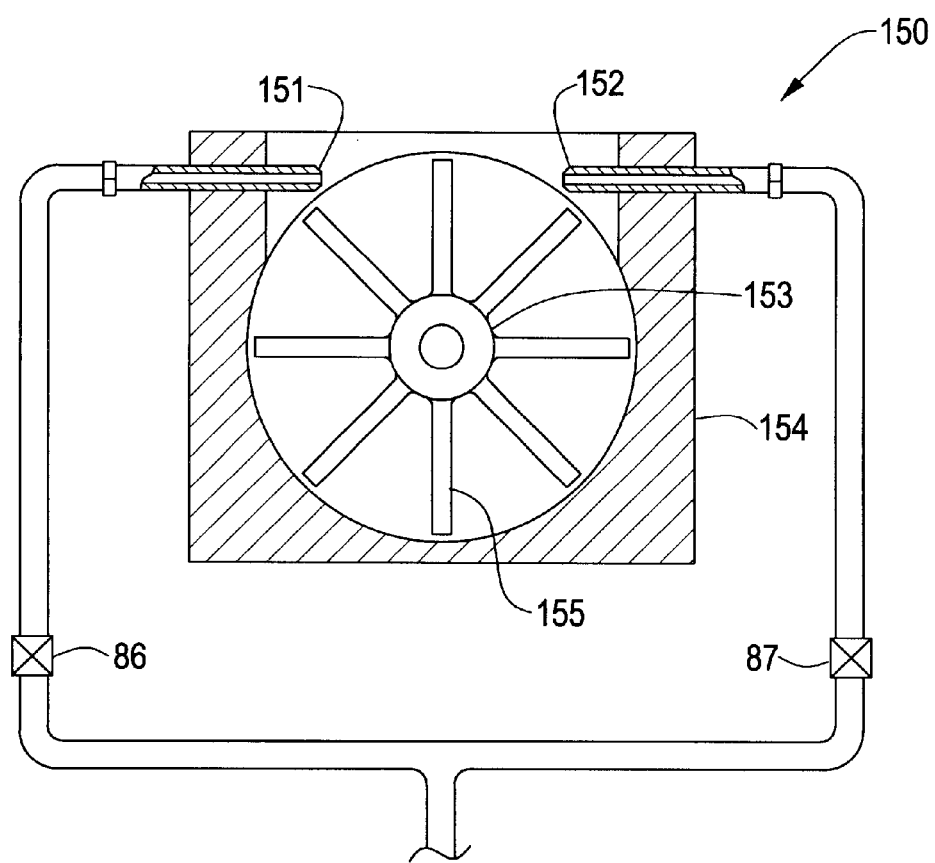
FIG. 7 is a partial sectioned view of the pneumatic turbine of the lifter.

FIG. 6A should be read in conjunction with FIG. 7. FIG. 7 is a partial sectioned view of pneumatic turbine 150. FIG. 7 shows pneumatic turbine 150 having a first nozzle 151, a second nozzle 152, an impeller 153, and an impeller block 154.

Referring to FIG. 2, the controller activates optically isolated electrical switch 76 which allows current to flow to intrinsically safe solenoid-driven pneumatic control valve 86. The flow of current activates valve 86, causing supply air to flow through first nozzle 151 of the pneumatic turbine. Pneumatic turbine 150 and first nozzle 151 are also shown in FIG. 7. Referring to FIG. 7, air flowing through first nozzle 151 impinges on impeller blades 155 causing impeller 153 to rotate in a first direction.

Figure 6B:
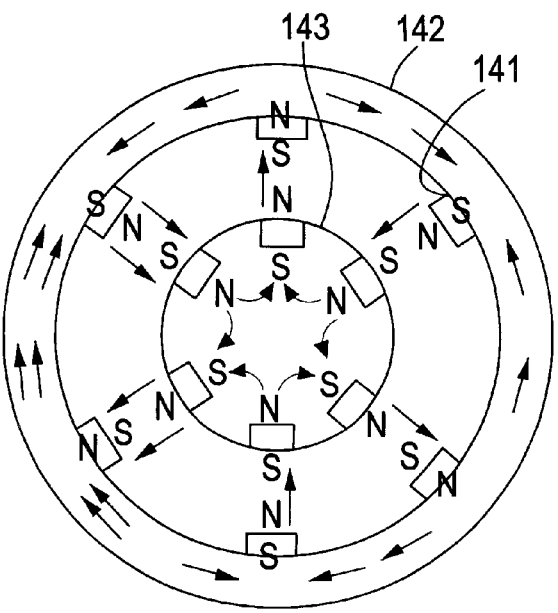
FIG. 6B shows the magnets and the magnetic fields of the magnetic coupler of the lifter drive motor assembly.

Referring again to FIG. 6A, when the cylindrical output end 156 of impeller 153 spins, outer drive magnets 141 of magnetic coupler 140 also spin. Outer drive magnets 141 are mounted to the inside of cylindrical output end 156. As shown in FIGS. 6A and 6B, the magnetic field produced by the spinning drive magnets 141 penetrates permeable band 142 and couples with inner coupling magnets 143 to turn first gear 134 of planetary gear train 131. The torque available from the magnetic coupling is weak, so a high rotational speed is required to provide the power needed to turn translation screw 159. This weak torque at high rotational speed turns first gear 134 of planetary gear train 131. The planetary gear train amplifies the torque in proportion to its reduction in rotational speed. The amplified torque applied to output shaft 158 turns translation screw 159. Translation screw 159 raises translation block 117 and the rest of carriage assembly 111.

To initiate the cylinder-falling phase of the calibration sequence, referring to FIGS. 2 and 6A, optically isolated electrical switch 77 is activated to allow current to flow to intrinsically safe solenoid-driven pneumatic control valve 87. This causes air to flow through second nozzle 152 causing impeller 153 to rotate in a second (opposite) direction to lower of carriage assembly 111. Carriage assembly 111 is driven down rapidly. Referring to FIG. 5A, this suddenly pulls first annular platform 115, and second annular platform 116, out from under cylinders 24 and 34, respectively. When this happens, both cylinders fall slowly at a rate that is limited by the viscosity of the fill-fluid.

Vertical Travel of the Cylinder

FIGS. 8A, 8B, 8C, and 8D show the falling cylinders of the embodiment of FIG. 1, in successive positions during vertical translation. Each FIG. shows the relationship between lifter carriage assembly 111, the two falling cylinders 24 and 34, and the two pistons 25 and 35. The relative vertical location of carriage assembly 111 in FIGS. 8A–8D is indicated by the relative vertical location of the lifter's translation block 117.

FIG. 8A shows the carriage assembly and the two cylinders in the raised position ready to start. From this position the lifter rotates its translation screw rapidly in a first direction to lower the carriage assembly quickly to its lowest position.

FIG. 8B shows the carriage assembly lowered and at its lowest position.

FIG. 8C shows the two cylinders at mid-point of their travel, falling very slowly at a viscosity-limited speed. During the slow steady-speed descent of the two cylinders, data indicative of differential pressure sensor output is acquired in the control room.

FIG. 8D shows the two cylinders at the end of their travel, ready to be lifted. The next step is for the lifter to rotate its translation screw in a second direction to raise the carriage assembly. The carriage assembly, as it rises, lifts the cylinder. To avoid creating a vacuum if the process pressure is low, the translation screw is rotated slowly.

Flow Source Device

Referring to FIG. 2, there can be no flow through generator 100 if high-pressure isolation valve 63, bypass valve 64, and low-pressure isolation valve 65, are all closed. Flow is needed to compress any gas bubbles that may be present in the high side of the differential pressure sensor. The preferred embodiment of the present invention includes a flow source device 68 with a gas-filled bellows 69, as shown in FIG. 3. During pressurization of the instrument, this gas-filled bellows will compress a predetermined amount sufficient to subsequently provide the required flow to bring any gas bubbles up to high side pressure. This process will be complete before the equilibrium period (falling component falling at constant speed) of the calibration sequence begins.

An alternative would be to allow operation to proceed with the low-pressure isolation valve 65 open. However, this would produce a noisy baseline reference during data acquisition.

Another alternative would be to fill the low side fluid volume with fill-fluid and a small bubble of gas to ensure a gas volume within the fluid volume. This gas volume would expand during the equilibrium period of the calibration sequence, thereby producing the desired flow. However, this would be difficult to do consistently on-site.

Precision Cylinder

Referring again to FIG. 3, first cylinder 24 includes a precision cylindrical liner 94, and second cylinder 34 includes an identical precision cylindrical liner 95. This ensures that each cylinder has a precision inner cylindrical surface. The liners are preferably made of abrasion-resistant steel. Suitable precision cylindrical liners are manufactured by Parker Cylinder, of Enfield, Conn., USA.

Minimization of Misalignment Errors

To minimize misalignment of a falling cylinder, each cylinder includes a base portion comprising a high-density stabilizing ring or, in other embodiments, a high-density stabilizing plate.

FIGS. 3 and 5A show first cylinder 24 having a closed top 101 and a high-density base portion in the form of first high-density stabilizing ring 49. Likewise, second cylinder 34 has a closed top 102 and a high-density base portion in the form of second high-density stabilizing ring 59.

The high-density stabilizing rings of the preferred embodiment locate the center of gravity of each cylinder lower than its center of buoyancy This provides a stable (anti-rotational), friction-free condition between the spherical piston and its falling cylinder. The high-density rings are preferably rings both made of the same material, preferably a high-density material such as tungsten, or lead. Each of rings 49 and 59 is attached to the base of the body of its associated cylinder by one or more screws 47, as shown in FIG. 3.

Because the motion of the cylinder under gravity must be vertical, and because the center of gravity of each cylinder is below its center of buoyancy, the vertical motion of the cylinder under gravity is stable (i.e., non-rotational). The cylinder may contact the spherical surface of the piston during the cylinder-falling period without introducing any significant friction because horizontal force is required between the vertical contact surfaces to produce friction, and no component of the force of gravity is horizontal. Accordingly, a stable condition exists during the cylinder-falling period, and there can be no significant degradation of the reference pressure by a frictional force.

To further minimize error caused by any misalignment of cylinder and piston, the peripheral annular portion 44 of the first piston has a spherical outer surface, as shown in FIGS. 1 and 3. For the same reason, the peripheral annular portion 45 of the second piston also has a spherical outer surface.

Process Fluid Isolator

It is known to isolate a sensor calibrator from process fluids to avoid corrosion and foreign particles from influencing the function of the device. In the prior art, such isolators typically use metal diaphragms, metal bellows or sealing fluids compatible with the process fluid.

The preferred embodiment of the present invention includes a process fluid isolator at each output port. FIG. 3 shows a pair of process fluid isolators 160.

Figure 9A:
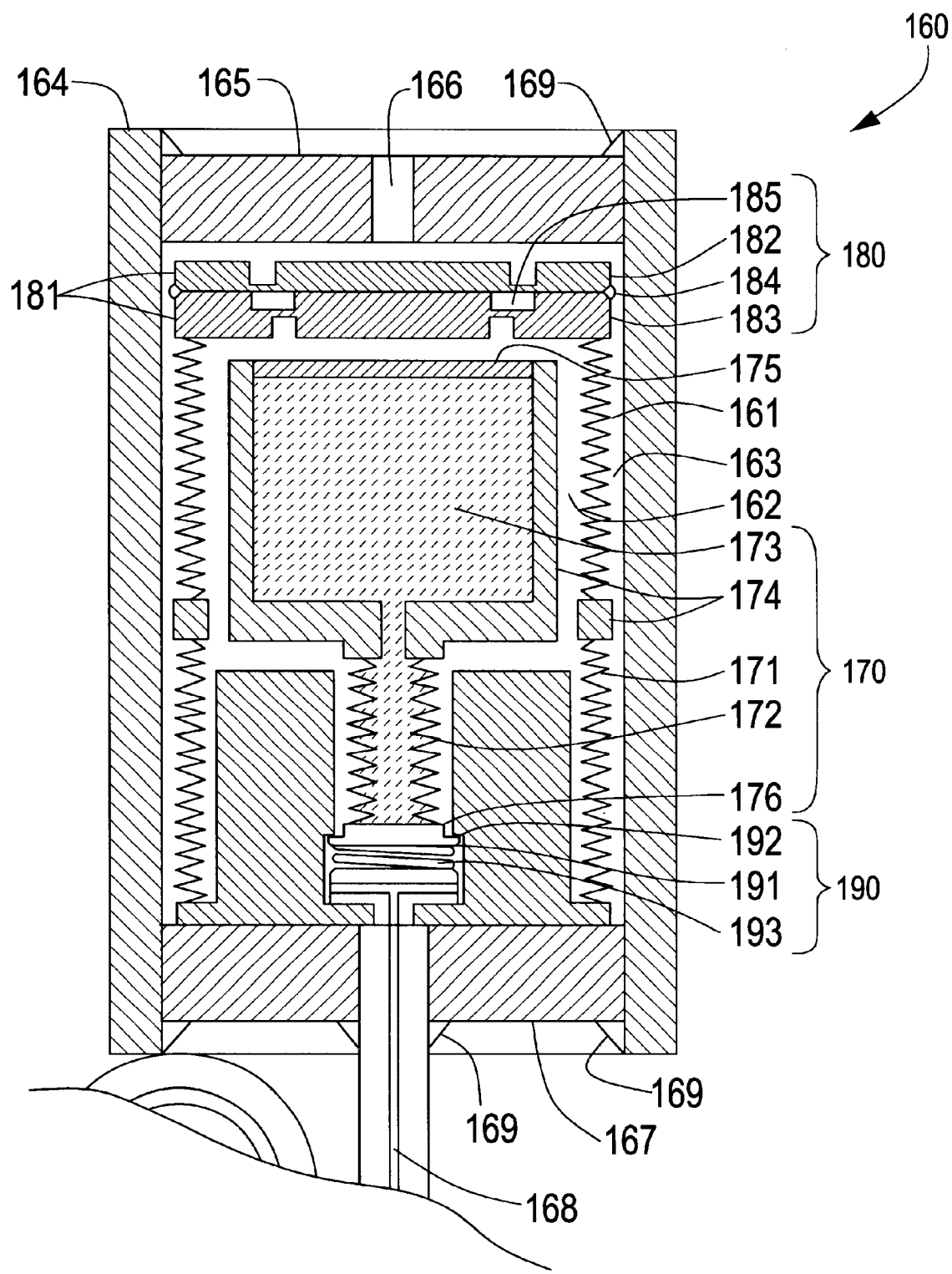
FIG. 9A is a sectioned view of the process fluid isolator.

FIG. 9A shows process fluid isolator 160 in detail, having isolation bellows 161.

Isolation bellows 161 isolates the working parts of the isolator and fill-fluid 162 from process fluid 163.

An important requirement for a pressure sensor calibrator is that the isolator must not influence the reference pressure developed by the pressure sensor calibrator. Process fluid isolator 160 must be able to expand or contract without requiring significant pressure across bellows 161. Any such pressure would reduce the reference pressure and therefore detract from the accuracy of the reference pressure generator. In a properly vented instrument, there is a minimal extension or contraction of the isolator because the only transfer of fluid from the low side to the high side is from the compression of the process fluid due to the application of reference pressure, which is insignificant. However, if the instrument is not properly vented and has a gas volume, the calibrator must compress this gas volume. This requires a volume transfer from the low side to the high side of the instrument. At gas pressures below 0.6 kPa (300 psi), this effect can be significant and may seriously detract from reference pressure accuracy.

In the first preferred embodiment, a process fluid isolator is used to minimize errors attributable to compliance caused by the presence of a foreign gas, or by the presence of a low-pressure process gas.

Preferably, isolation bellows 161 has ten convolutions, and the metal of the convolutions is 0.05 mm (0.002 inch) thick.

Preferably, as shown in FIG. 9A, process fluid isolator 160 further includes temperature compensator 170 with a large bellows 171 and a small bellows 172. In the first preferred embodiment, this process fluid isolator further includes a process pressure compensator 180 with a diaphragm assembly 181.

Preferably, as shown in FIG. 9A, process fluid isolator 160 further includes overpressure protector 190 having a spring-loaded disk 191 that is stopped by a support edge 192.

Process fluid isolator 160 of FIG. 9A includes cylindrical housing 164, process end cap 165 defining process port 166, and calibrator end cap 167 defining calibrator port 168. The housing and the two end caps contain and protect the above-mentioned isolation bellows, temperature compensator, process pressure compensator, and overpressure protector. A number of welds 169 seal the assembly.

Temperature Compensation using Large and Small Bellows

Temperature compensation is provided to eliminate error resulting from expansion or contraction of the isolation bellows caused by expansion or contraction of the fill-fluid due to changes in ambient temperature. The thermal expansion of fill fluid is typically 4% per 55 degrees Celsius (100 degrees Fahrenheit). Allowing fill-fluid temperature changes to extend or contract the bellows would increase the stiffness of the bellows and produce unacceptable errors.

Referring to FIG. 9A, temperature compensator 170 encloses a thermal-sense volume 173 of fill-fluid, the volume defined by flanged cup 174, lid 175, small bellows 172, and small bellows end-cap 176. The thermal-sense volume responds to a thermal change by expanding or contracting to cause large bellows 171 to extend or contract. The ratio of the area of large bellows 171 to the area of small bellows 172 is made, by design, equal to the ratio of the volume of the main calibrator fill-fluid to the volume of thermal sense volume 173. Thus, the volume decrease or increase between the large bellows and small bellows is equal to the volume increase or decrease of the main calibrator fill-fluid by the expansion or contraction of fill-fluid in the main calibrator. Achieving this relationship assures that the isolation bellows remains in its preferred position and is not extended or contracted.

Process Pressure Compensation using Large and Small Diaphragm Plates

Pressure compensation is provided to eliminate error resulting from expansion or contraction of the isolation bellows caused by changes in process pressure. Typically, an increase of process pressure will compress the fill fluid of the calibrator by 0.5% per 6.8 kPa (1,000 psi). This would move isolation bellows 161 away from its preferred position.

Process pressure compensator 180 includes diaphragm assembly 181. Diaphragm assembly 181, in a preferred embodiment, consists of large diaphragm plate 182 and small diaphragm plate 183 attached by weld 184. Within cavity 185 between the large diaphragm plate and the small diaphragm plate is trapped air at atmospheric pressure.

Figure 9B:
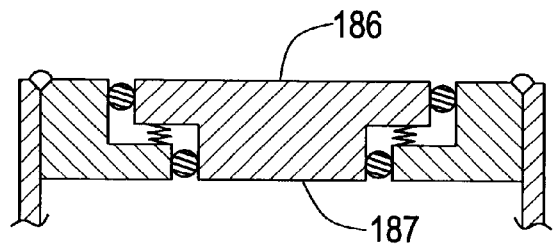
FIG. 9B is an illustrative model of the process pressure compensation diaphragm.
Figure 9C:
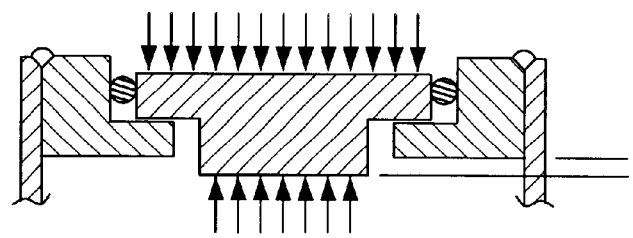
FIG. 9C illustrates the operation of the process pressure compensation diaphragm.

FIGS. 9B, and 9C illustrate the principle of operation of the process pressure compensation diaphragm using an illustrative model. FIGS. 9B and 9C show a spring-loaded stepped disk sealed by rubber "o" rings. This constitutes an illustrative model of the actual structure shown in FIG. 9A. Process pressure is applied via process fluid to the larger diameter surface 186. The same pressure is applied via fill-fluid to the smaller diameter surface 187. Because of the difference in areas, a force is developed in the direction of the smaller diameter surface. Acting against the spring, this produces a displacement of sufficient volume to compensate for the compression of the fill-fluid by the typically high pressure of the process fluid. This action maintains isolation bellows 161 in its preferred position regardless of increases in process pressure. In practice, the pressure applied to the small diaphragm plate is slightly less than the process pressure due to the pressure required to deflect isolation bellows 161 as the fluid fill is compressed. However, this difference is insignificant.

Over-Pressure Protection using Spring-Loaded Support Disk

Isolation bellows can be damaged by the application of excessive process pressure to one side of the instrument. However, isolation bellows 161, and large bellows 171 of the thermal compensator are designed to accept the full process pressure and deflect to a fully compressed position. In this compressed condition the thin metal convolutions support each other and no damage occurs.

On the other hand, small bellows 172 cannot deflect to a compressed position. Without other support, it would be damaged by the application of excessive process pressure. Support is provided by disk 191 contacting support edge 192 when the force due to process pressure overcomes the force provided by spring 193 allowing small bellows 172 to deflect downward, being constrained only by the weak force of the spring, so that the small bellows is not damaged.

Installations With No Process Fluid Isolator

In processes in which the process fluid is a benign fluid, and the process fluid isolator is omitted, process fluid may take the place of fill-fluid.

Figure 9D:
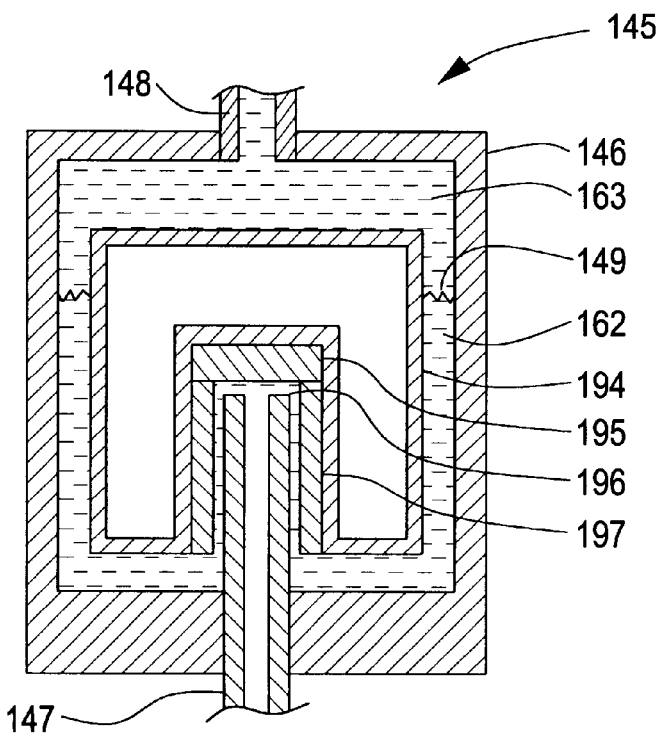
FIG. 9D is a sectioned view of the fill-fluid retainer.

In other processes in which the process fluid isolator is omitted, and the process fluid is a gas, fill-fluid is used in contact with process fluid. In such cases, it is desirable to prevent temporary over-range pressure conditions from flushing fill-fluid from the instrument being calibrated. FIG. 9D shows fill-fluid retainer 145 according to the present invention. Retainer 145 includes an enclosure 146, a reference pressure port 147 for admitting reference pressure from the reference pressure generator, and an instrument port 148 coupled to the instrument to be calibrated. The enclosure contains fill-fluid 162 and process fluid 163 in contact at interface 149. The enclosure also contains air-filled float 194 with seal pad 195 straddling seal seat 196 of reference pressure port 147. Normally, air-filled float 194 floats within enclosure 146 at interface 149 to provide an open pressure path from reference pressure port 147 to instrument port 148. When overpressure appears at instrument port 148, the seal pad closes the seal seat to prevent loss of fill-fluid. When pressure returns to normal, float 194 will return to its operating position by buoyancy. Tubular guide 197 maintains vertical alignment. Preferably, the seal pad, the seal seat, and the tubular guide are made of Teflon™.

Method of Use of the First Preferred Embodiment

The method of use of the first preferred embodiment can be understood from FIGS. 1 and 2. Zero and span calibrations include the following steps.

1. Zero Calibration
    a) open valve 64 to equalize the pressures in the sensor;
    b) close valves 65 and then 63 to isolate the sensor from the process;
    c) adjust the sensor for zero output value.
2. Span Calibration
    a) open valve 64 to equalize the pressures in the sensor;
    b) close valves 65 and then 63 to isolate the sensor from the process;
    c) open valve 66;
    d) close valve 64 to isolate the sensor input ports from each other;
    e) raise cylinders 24 and 34;
    f) release cylinders 24 and 34 simultaneously;
    g) monitor sensor output during a period of descent;

h) test for suspect data points;
i) discard suspect data points;
j) calculate average span output value;
k) adjust the sensor for calculated average span output value.

After the series of data points has been recorded, the d/p cell is returned to service. Referring to FIG. 2, the d/p cell is returned to service by first closing valve 66, then opening valve 63, then closing valve 64, and then opening valve 65.

Second Embodiment

A second embodiment is a differential pressure generator using a side-by-side pair of opposed novel gravity transducers of the inverted-cup falling-cylinder type. Second embodiment 200 is shown in FIG. 10. The second embodiment uses the same type of gravity transducers as the first preferred embodiment, but configures them side-by-side instead of vertically stacked.

First gravity transducer 223 of FIG. 10 includes first cylinder 224 and first piston 225. First cylinder 224 is closed at one end to define first chamber 226. Fill-fluid fills first enclosure 221 and first cylinder 224, and surrounds first piston 225. The falling component is cylinder 224.

Likewise, second gravity transducer 233 includes second cylinder 234 and second piston 235. Second cylinder 234 is closed at one end to define second chamber 236. Fill-fluid fills second enclosure 231 and second cylinder 234, and surrounds second piston 235. The second falling component is cylinder 234.

Fill-fluid is indicated in FIG. 10 as 42. Fill-fluid fills first and second enclosures 221 and 231, and drive enclosure 243. Drive enclosure 243 serves as an open conduit for fill-fluid between enclosures 221 and 231, so enclosures 221 and 231 are always at the same pressure.

First chamber 226 is pressure-coupled to first output conduit 222 via first chamber conduit 228. Second chamber 236 is pressure-coupled to second output conduit 232 via second chamber conduit 238. Each of first chamber conduit 228 and second chamber conduit 238 is formed as the hollow interior of respective first and second piston support pillars.

First cylinder 224 includes first body 227, and second cylinder 234 includes second body 237. First body 227 has the same dimensions and the same volume as second body 237. However, the material, of which first body 227 is made, is more dense than the material of which second body 237 is made. Accordingly, by design, first cylinder 224 is heavier than second cylinder 234.

To achieve a useful range, each body includes a large-volume weight portion at its lower end. First body includes first large-volume weight portion 246. Second body includes second large-volume weight portion 247. The large-volume weight portions are shown in FIG. 10 as portion 246 in first cylinder 224, and as portion 247 in second cylinder 234.

To minimize misalignment of a falling cylinder, each cylinder includes a high-density stabilizing ring. FIG. 10 shows first and second cylinders 224 and 234 having first and second high-density stabilizing rings 248 and 249, respectively. These high-density rings locate the center of gravity of each cylinder lower than its center of buoyancy.

A lifter is coupled to lift and release both cylinders simultaneously, so that the two cylinders fall simultaneously. The lifter is not shown in FIG. 10. It is similar to the lifter described below as part of the third embodiment.

First cylinder 224, falling in viscosity-limited relationship with the first piston, as indicated by arrow A1, develops a first (high) pressure in the closed region of the first cylinder. Second cylinder 234 falling in viscosity-limited relationship with the second piston, as indicated by arrow A2, develops a second (high) pressure in the closed region of the second cylinder. The two cylinders fall simultaneously and have the same volume. However, the first cylinder is heavier than the second cylinder so the first cylinder develops a greater (high) pressure. The sum of the first pressure and the opposed second pressure is the reference differential pressure.

Third Embodiment

A third embodiment is a differential pressure generator using a side-by-side pair of opposed novel gravity transducers of the upright-cup falling-cylinder type. The third embodiment is shown in FIGS. 11–15.

Figure 11:
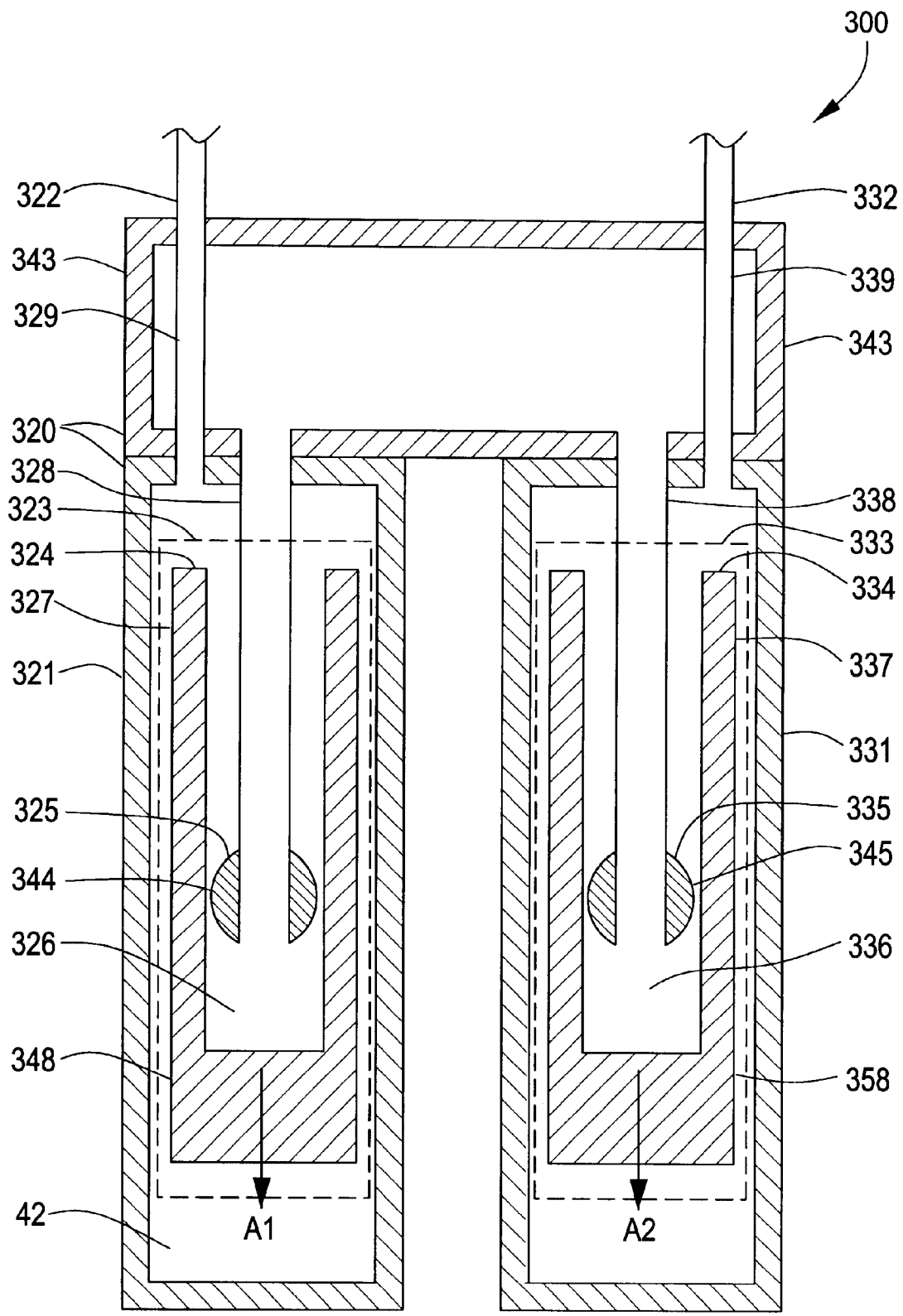
FIG. 11 is a schematic front view of a third embodiment of a differential pressure generator according to the present invention, using a side-by-side pair of opposed novel gravity transducers of the upright-cup falling-cylinder type.

FIG. 11 is a schematic front view of the third embodiment. Note that, in contrast to the first and second embodiments, the cylinder of the third embodiment falls closed end first.

Third gravity transducer 323 of FIG. 11 includes first cylinder 324 (the first falling component) and first piston 325. Cylinder 324 is closed at one end. Piston 325 and the closed end of cylinder 324 define first chamber 326. Fill-fluid 42 fills first enclosure 321 and surrounds piston 325. Likewise, second gravity transducer 333 includes second cylinder 334 (the second falling component) and second piston 335. Cylinder 334 is closed at one end. Piston 335 and the closed end of cylinder 334 define second chamber 336. Fill-fluid 42 fills second enclosure 331 and surrounds second piston 335. Fluid, preferably fill-fluid 42, also fills drive enclosure 343. Drive enclosure 343 serves as a conduit for fill-fluid between enclosures 321 and 331.

First enclosure 321 is pressure-coupled to first output conduit 322. First chamber 326 is pressure-coupled to second chamber 336. Second enclosure 331 is pressure-coupled to second output conduit 332. Each of first chamber conduit 328 and second chamber conduit 338 is formed as a hollow interior of the suspension tube of respective first and second pistons 325 and 335.

In the third embodiment, as shown in FIG. 11, first cylinder 324 includes first body 327, and second cylinder 334 includes second body 337. First body 327 has the same dimensions and the same volume as second body 337. However, the material, of which first body 327 is made, is more dense than the material of which second body 337 is made. Accordingly, by design, first cylinder 324 is heavier than second cylinder 334.

To achieve a useful range, each body includes a large-volume weight portion at its lower end. First body includes first large-volume weight portion 348. Second body includes second large-volume weight portion 358. The large-volume weight portions are shown in FIG. 11 as portion 348 in first cylinder 324, and as portion 358 in second cylinder 334

A lifter (not shown in FIG. 11) is coupled to lift and release both cylinders at the same time, so that the two cylinders fall simultaneously.

The first cylinder falling, as indicated by arrow A1 in FIG. 11, in viscosity-limited relationship with the first piston, develops a first pressure below the first piston (i.e., in chamber 326) that is lower than the pressure above the first piston (i.e., at output conduit 322). Likewise, the second cylinder falling, as indicated by arrow A2 in FIG. 11, in viscosity-limited relationship with the second piston develops a second pressure below the second piston (i.e., in chamber 336) that is lower than the pressure above the second piston (i.e., at output conduit 332). The two cylinders have the same volume but the first cylinder is heavier than the second cylinder so the first cylinder develops a pressure across the first piston than is greater than the corresponding pressure across the second piston. Because chamber 326 is pressure coupled to chamber 336, the pressure in both chambers is equal. The two cylinders fall simultaneously so the sum of the opposed pressures across the pistons appears across output conduit 322 and output conduit 332, the output pressure at conduit 322 being higher than the output pressure at conduit 332. The pressure difference across conduits 322 and 332 is the reference differential pressure.

Thus, because the first side has a heavier cylinder than the second side, causing the output pressure at conduit 322 to be higher than the output pressure at conduit 332, the first side is the "high side" and the second side is the "low side".

Figure 12:
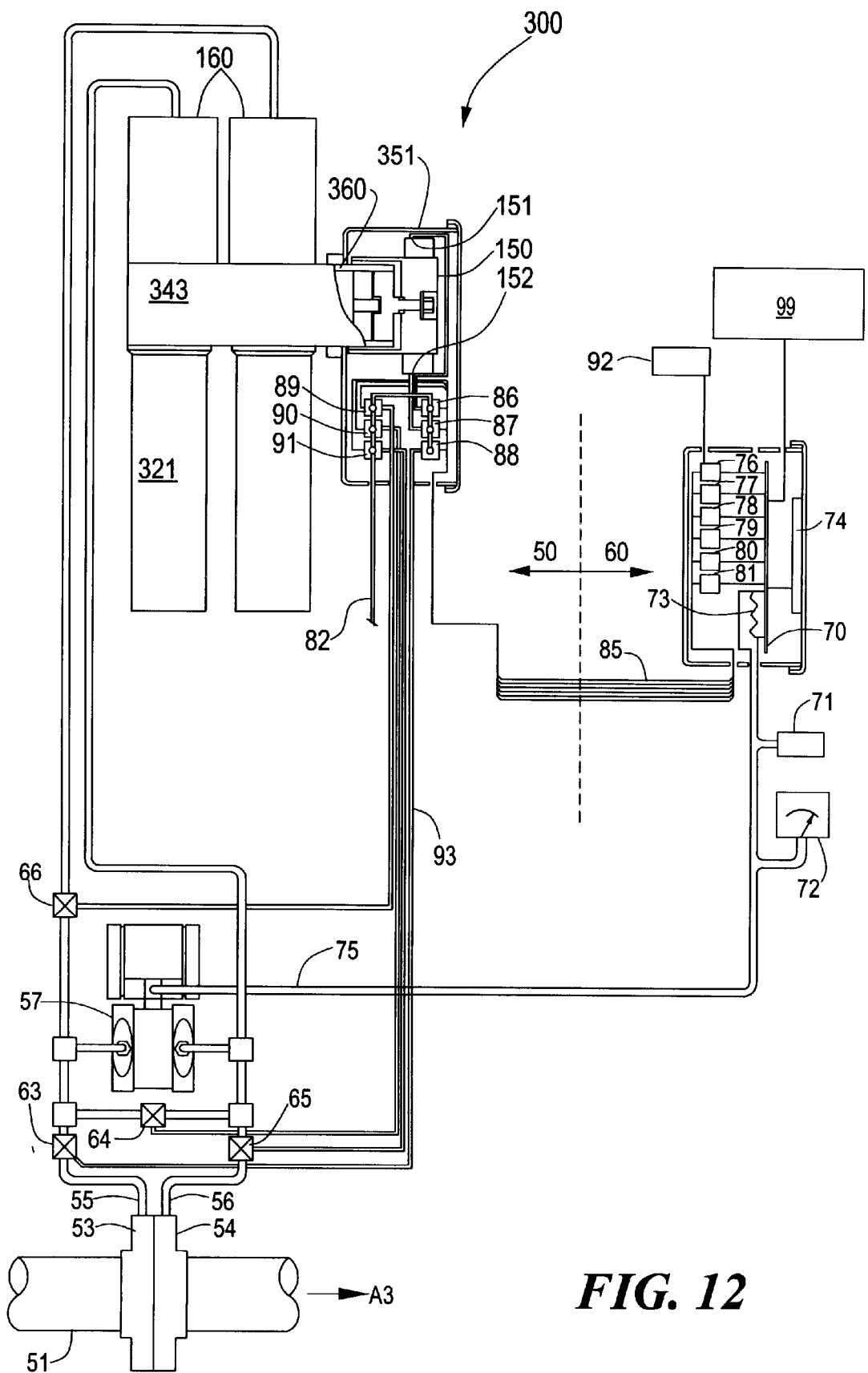
FIG. 12 is a schematic front view of a differential pressure flow measuring system configured for in-situ calibration using the differential pressure generator of FIG. 11.

FIG. 12 is a schematic front view of a differential pressure flow measuring system configured for in-situ calibration using the differential pressure generator of FIG. 11. It displays the key components of the in-situ calibration system, some in process area 50, others in control room 60.

Arrow A3 in FIG. 12 represents process fluid flow direction from left to right. Flow in process pipe 51 through an orifice plate (not shown), between upstream flange 53 and downstream flange 54, produces a pressure difference that is measured across upstream tap 55 and downstream tap 56 by conventional differential pressure transmitter ("d/p cell") 57. Since flow direction is from left to right, the left side is at a slightly higher pressure than the right side.

When differential pressure generator 300 is mounted for calibration of a d/p cell, the first side of the generator is coupled to the "high side" and the second side of the generator is coupled to the "low side", as shown in FIG. 12.
Intrinsically-Safe Electro-Pneumatic Lifter Control FIG. 12 shows a third embodiment 300 of the present invention connected to a nearby differential pressure transmitter 57, both located in process area 50.

The equipment used and the method of calibration are substantially the same as those described above for the first preferred embodiment.
Lifting and Dropping the Cylinder FIGS. 14A–14C illustrate the relationship between the falling plumb and the falling cylinder.

Figure 14C:
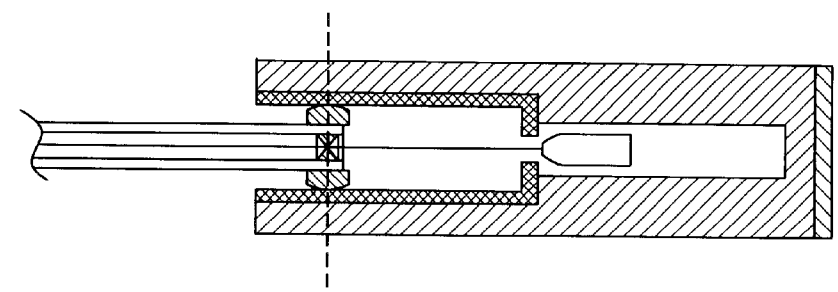
FIGS. 14A, 14B and 14C show one upright-cup falling cylinder in the up, intermediate, and down positions, respectively.
Figure 14B:
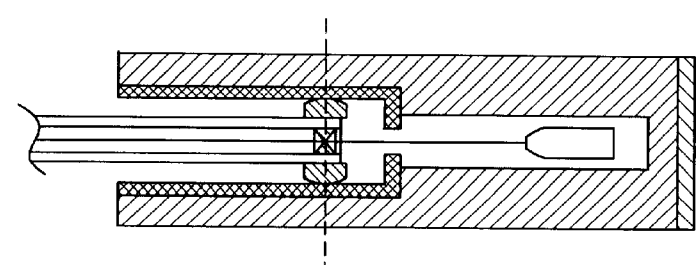
Figure 14A:
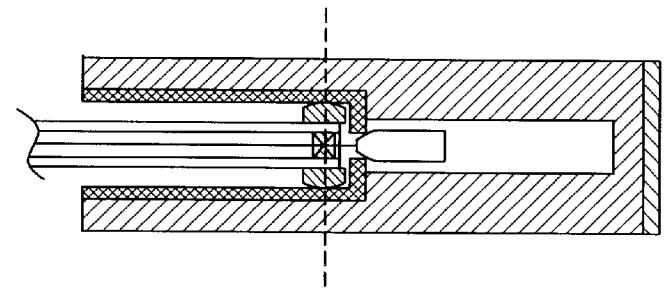

FIG. 14A shows the plumb and the cylinder in position ready to start. From this position the lifter rotates the spool rapidly to allow the plumb to fall quickly to its lowest position.

FIG. 14B shows the falling process started. The plumb is shown in its lowest position. The cylinder, its falling speed limited by viscosity, has fallen only a short distance. The cylinder continues to fall very slowly, at a viscosity-limited speed. During the slow steady-speed descent of the cylinder, data indicative of differential pressure sensor output is acquired in the control room. Referring to FIG. 12, data is acquired from differential pressure transmitter 57 at controller 70 via first intrinsically safe electrical wiring 75 and resistor 73. Controller 70 is coupled to optically isolated electrical switches 76–81, to display 74 and to data link 99.

Figure 15:
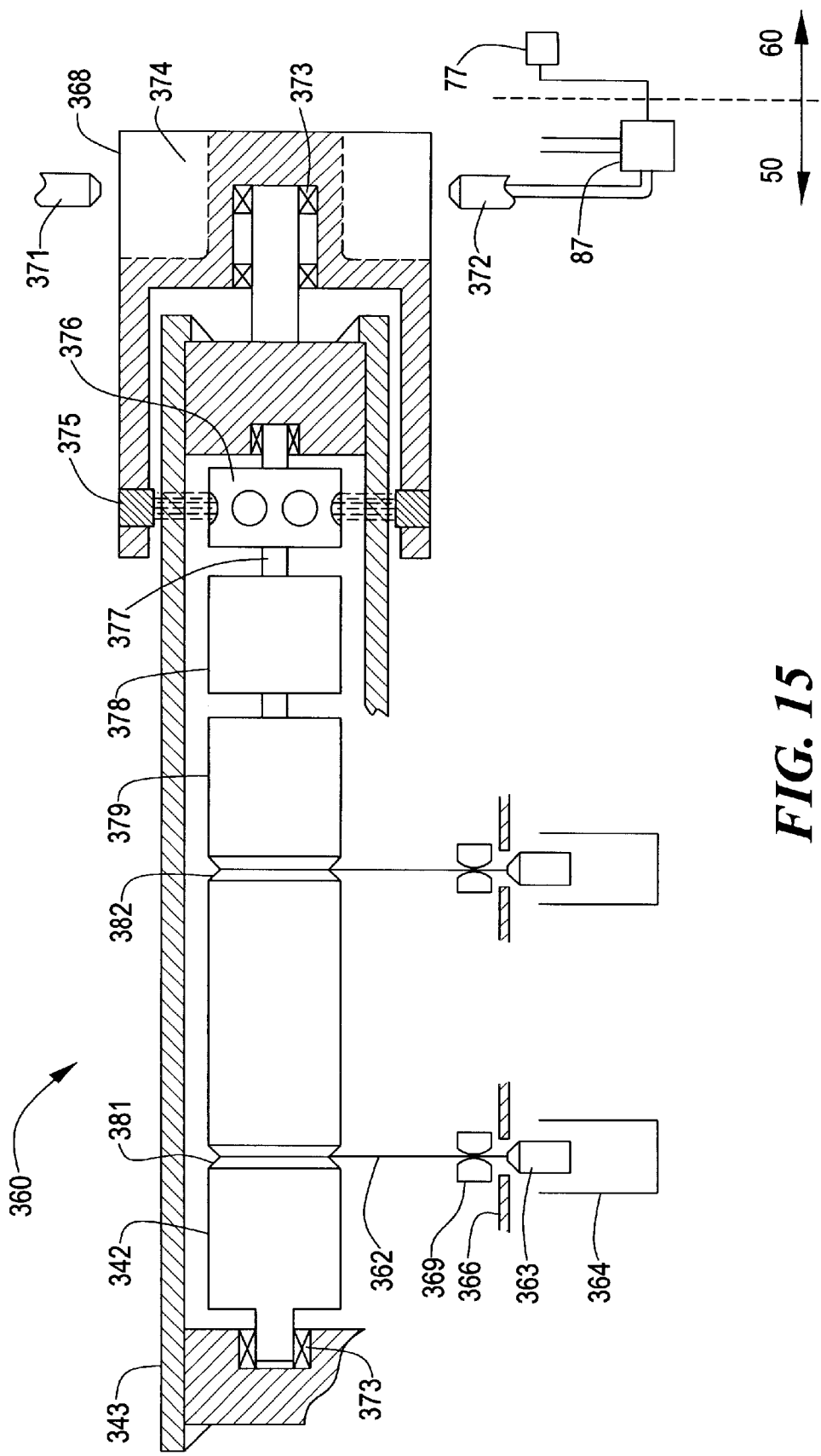
FIG. 15 is a schematic front view of the cable-type lifter of the differential pressure generator of FIG. 11.

FIG. 14C shows the falling process ended, The cylinder has reached its lowest position. The next step is for the lifter to raise the cable. This causes the cable to raise the plumb, which causes the plumb to raise the cylinder.
Lifter Operation FIG. 15 is a schematic front view of the lifter of the generator of FIG. 11, showing the lifter's pneumatic, magnetic and mechanical drive components, its two spools, its two weighted cables, and its two cable guides. The pneumatic turbine of the lifter drive is substantially the same as the pneumatic turbine described above for the first preferred embodiment.

Referring to FIG. 15, the controller activates optically isolated electrical switch 77 which allows current to flow to intrinsically safe solenoid-driven pneumatic control valve 87. The flow of current activates valve 87, causing supply air to flow through nozzle 372 into a pneumatic turbine 368 (similar to the turbine discussed above and shown in FIG. 7). Air flowing through nozzle 372 causes impeller 374 to rotate in a first direction. Impeller 374 turns first magnetic driver 375. The magnet field penetrates the non-permeable metal of enclosure 343 and couples with second magnetic coupler 376 to turn drive shaft 377. The torque available from the magnetic coupling is weak, so a high rotational speed is required to provide the power needed to turn drive shaft 377. This weak torque at high rotational speed drives planetary gear train 378. The planetary gear train amplifies the torque in proportion to its reduction in rotational speed. The amplified torque drives spools 381 and 382 to raise the two plumbs.

Likewise, returning to FIG. 12, activating optically isolated electrical switch 76 allows current to flow to intrinsically safe solenoid-driven pneumatic control valve 86. This causes air to flow through nozzle 371 (see FIG. 15) causing impeller 374 to rotate in a second (opposite) direction to lower the two plumbs. See plumb 363.

Figure 13A:
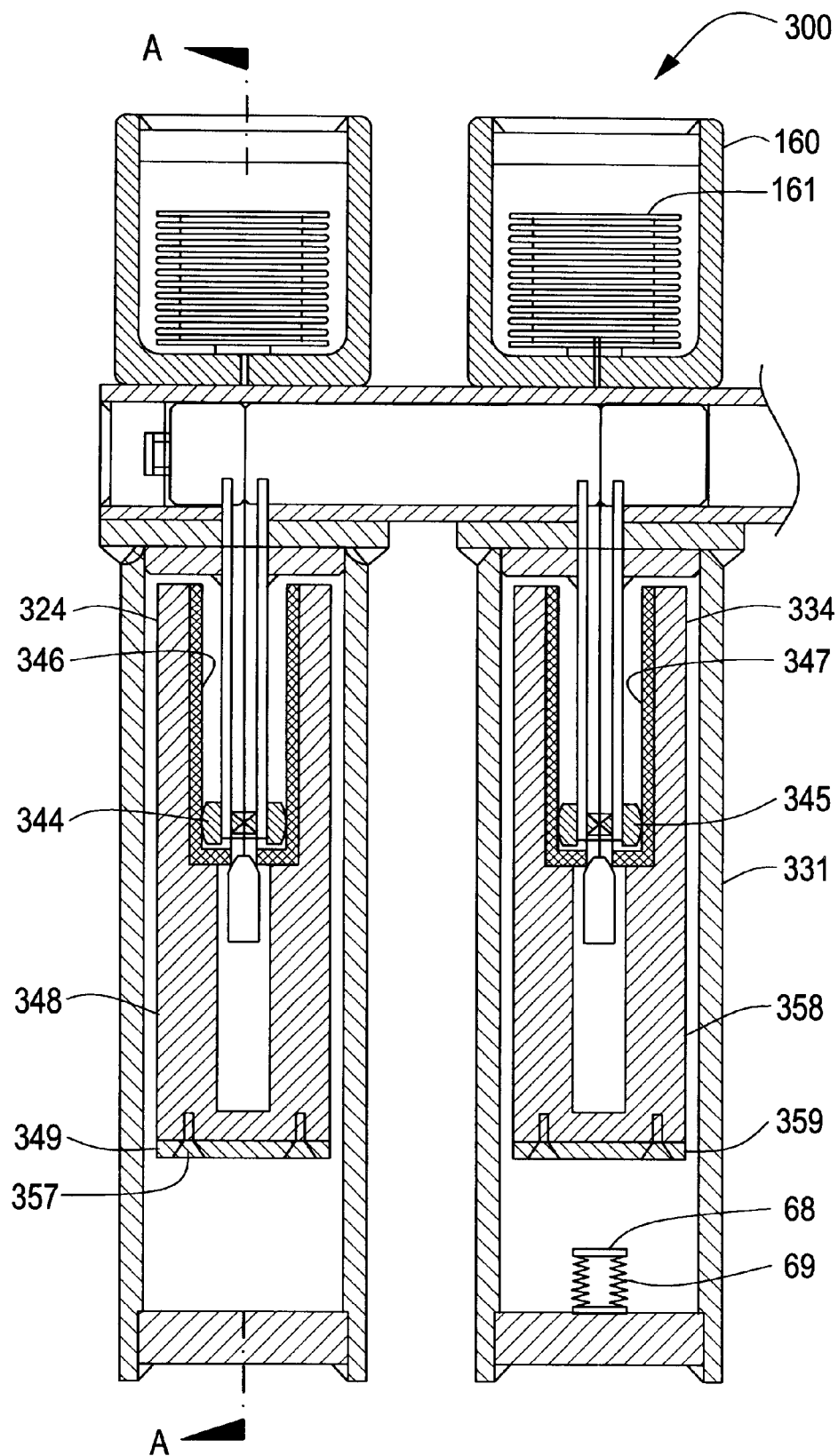
FIG. 13A is a sectioned view of the differential pressure generator of FIG. 11.
Figure 13B:
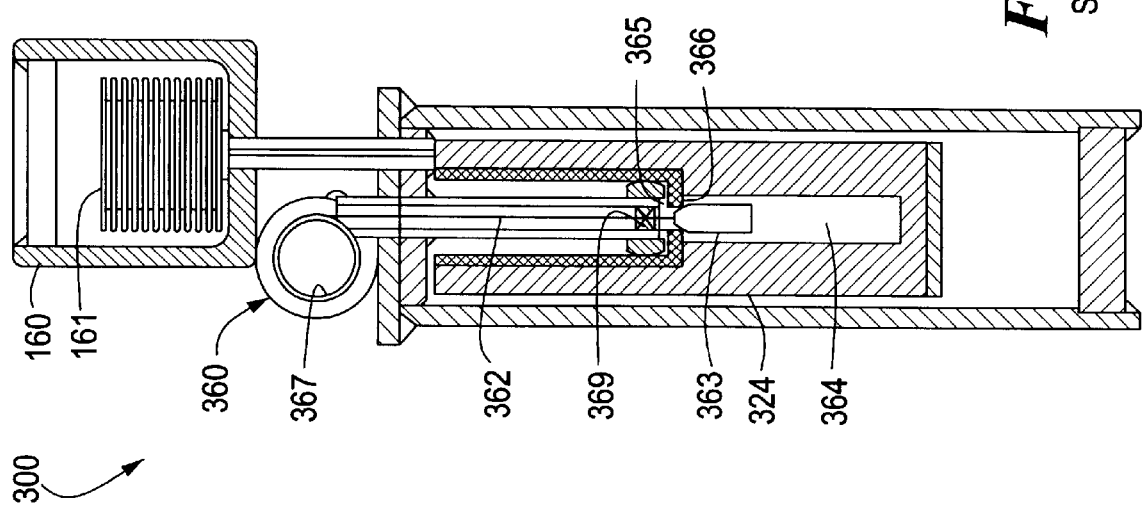
FIG. 13B is a sectioned side view across A—A of FIG. 13A.

Early in the calibration sequence, the plumb is dropped so that it falls rapidly, allowing the cylinder to fall at a rate that is limited, after a very short time, by the viscosity of the fill-fluid. To drop the plumb, the spool rotates in a direction to lower the plumb. Referring to FIG. 13B, plumb 363 falls in cavity 364 defined by cylinder 324. Because the plumb has very large clearances in the cavity, the induced viscous resistance is quite low, and the plumb falls at a much faster rate than the cylinder. By design the plumb is configured to reach the extreme position before the cylinder reaches its terminal velocity. This arrangement ensures that the effect on reference pressure caused by plumb release is minimal.
Cable Guides As shown in FIG. 13B, cable 362 and plumb 363 are lowered by spool 367 of lifter 360. Also cable 362 passes through cable guide 369 and top opening 365 of cavity 364. Annular stop 366 is located at a point proximate to top opening 365. Cable guide 369 is located at a point proximate to the center of the spherical portion of the piston surface. Accordingly, because the plumb and the cylinder are effectively suspended under gravity from the same point, they will automatically attain the same inclination. So, within a finite angular range, there will be no frictional contact between plumb and cylinder caused by off-vertical installation of the main housing. Therefore, within a finite angular range, there will be no error in reference pressure due to frictional contact between plumb and cylinder caused by off-vertical installation.

As noted above, the center of gravity of each cylinder is below its center of buoyancy. So a stable condition exists during the cylinder-falling period, and there can be no significant degradation of the reference pressure by a frictional force.
Precision Cylinder To ensure that each cylinder has a precision inner cylindrical surface, first and second cylinders 324 and 334 include precision cylindrical liners 346 and 347, respectively, as shown in FIGS. 13A and 13B. Precision cylindrical liners are used for the same reasons given above for their use in the first preferred embodiment.
Minimization of Misalignment To minimize misalignment of a falling cylinder, each cylinder includes a high-density stabilizing plate. FIG. 13A shows first and second cylinders 324 and 334 having first and second high-density stabilizing plates 349 and 359, respectively. High-density stabilizing plates 349 and 359 are secured to respective cylinders by screws 357. High-density plates are used for the same reasons given above for the use of high-density stabilizing rings in the first preferred embodiment.

Minimization of Misalignment Error

To minimize error caused by any misalignment of cylinder and piston, the peripheral annular portion 344 of the first piston has a spherical outer surface, as shown in FIGS. 11 and 13A. For the same reason, the peripheral annular portion 345 of the second piston also has a spherical outer surface.

Flow Source Device

The third embodiment includes a flow source device 68 with a gas-filled bellows 69, as shown in FIG. 13A. The flow source device is used for the same reasons given above for use in the first preferred embodiment.

Process Fluid Isolator

The third embodiment includes a pair of process fluid isolators 160, as shown in FIG. 12. Process fluid isolators are used for the same reasons given above for their use in the first preferred embodiment. Process fluid isolator 160 is shown in detail in FIG. 9A.

Method of Use of the Third Embodiment

The method of use of the third embodiment can be understood from FIGS. 11 and 12. It is substantially the same as the method of use as described above for the first embodiment.

Fourth Embodiment

Figure 16:
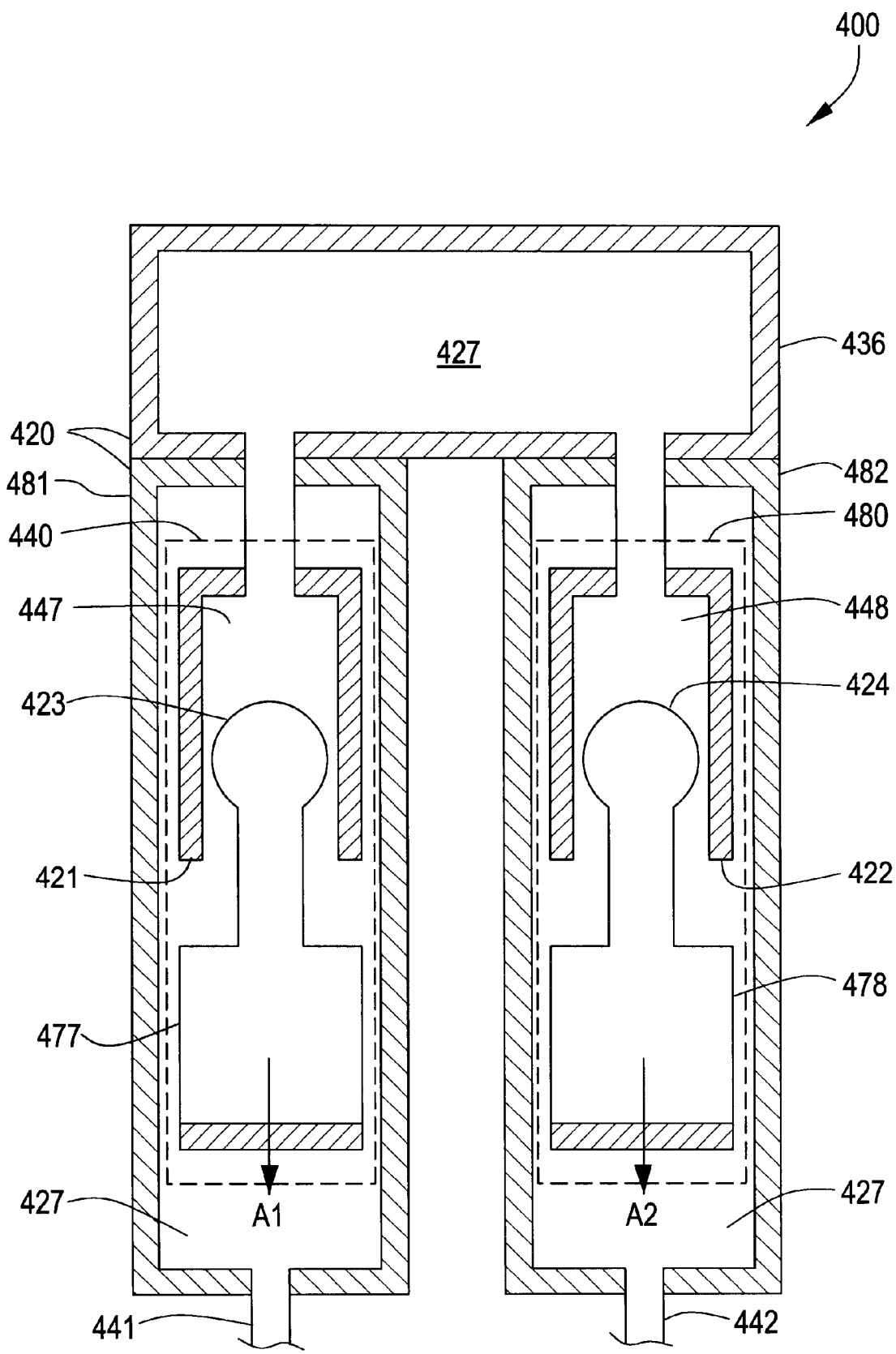
FIG. 16 is a schematic front view of a fourth embodiment of a differential pressure generator according to the present invention, using a side-by-side pair of opposed gravity transducers of the falling-ball type.

FIG. 16 illustrates a fourth embodiment 400 of the differential pressure generator invention. The two gravity transducers used in this embodiment are similar to the reference pressure device of the falling-ball differential pressure generator disclosed in U.S. Pat. No. 5,065,611. The falling components are pistons 423 and 424.

FIG. 16 shows differential pressure generator 400 having housing 420 defining first fluid-filled enclosure 481 and second fluid-filled enclosure 482. Housing 420 also defines a first output conduit 441 and a second output conduit 442. A first gravity transducer 440 is suspended in fluid within the first enclosure. A second gravity transducer 480 is suspended in fluid within the second enclosure.

First gravity transducer 440 includes cylinder 421 and piston 423. Cylinder 421 is configured at a first upper region to define first chamber 447. Fluid (in some 20 embodiments fill-fluid 427) fills enclosure 481 and cylinder 421, and surrounds piston 423. Piston 423 is the falling component.

First enclosure 481 is pressure-coupled to first output conduit 441. First chamber 447 is pressure-coupled to second chamber 448. Second enclosure 482 is pressure-coupled to second output coupling 442. First chamber 447 and second chamber 448 are pressure-coupled via lifter housing 436. (The lifter of the fourth embodiment is essentially similar to lifter 360 of the third embodiment).

To achieve a useful range, each piston of the first preferred embodiment includes a weight. First piston 423 includes weight 477. Second piston 424 includes weight 478. The second piston has a volume that is equal to the volume of the first piston and has a specific weight that is greater than the specific weight of the fluid and less than the specific weight of the first piston. The lifter is coupled to lift and release both pistons at the same time, so that the two pistons fall simultaneously.

Figure 17:
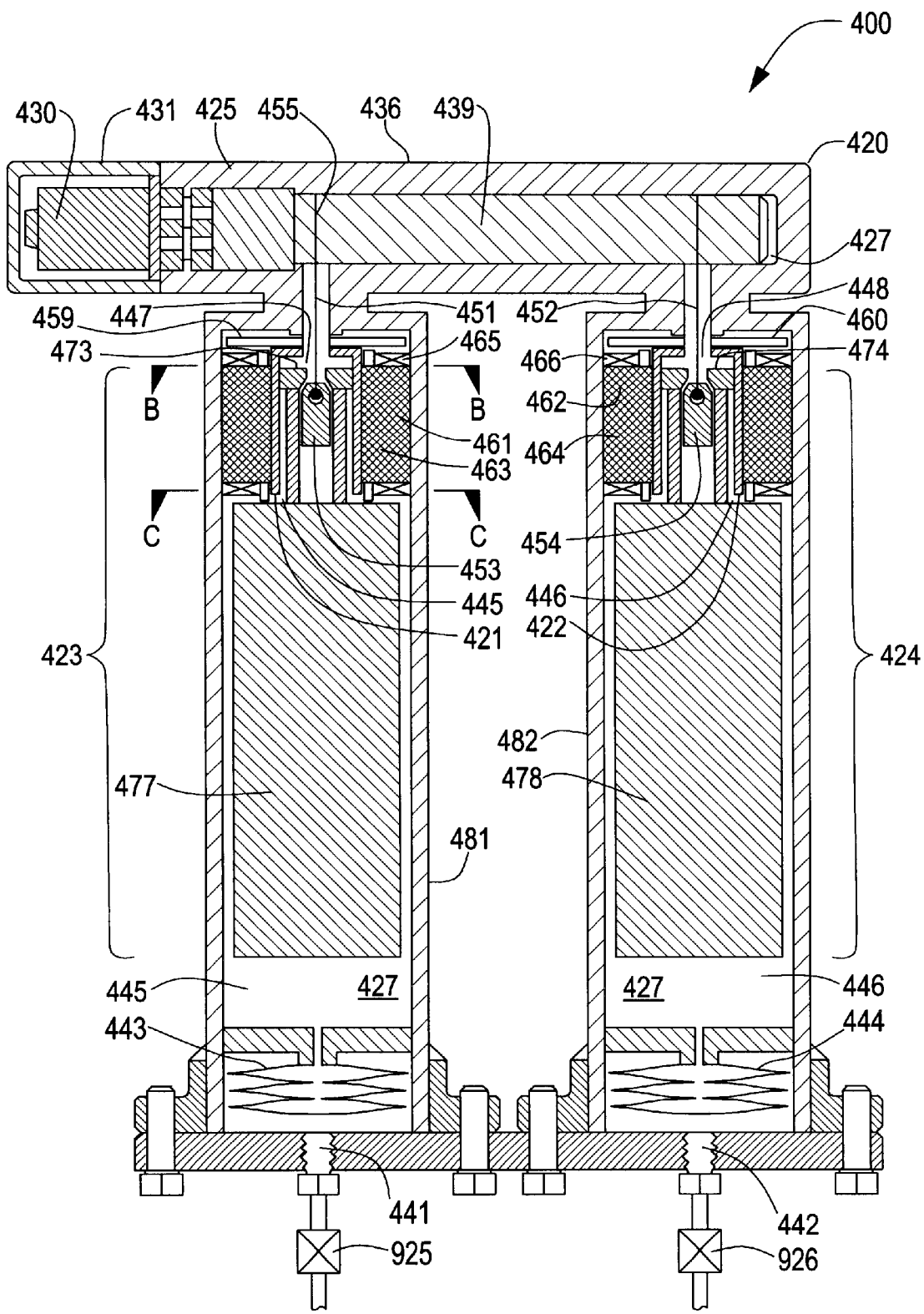
FIG. 17 is a sectioned front view of the differential pressure generator of FIG. 16.
Figure 18:
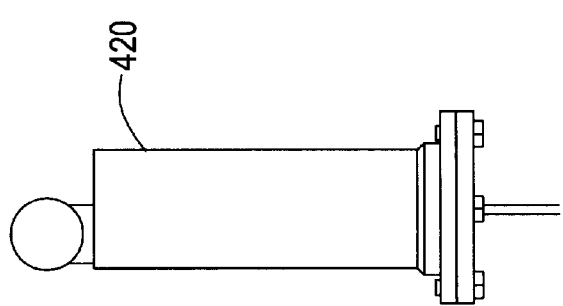
FIG. 18 is a side view of the generator of FIG. 16.
Figure 19:
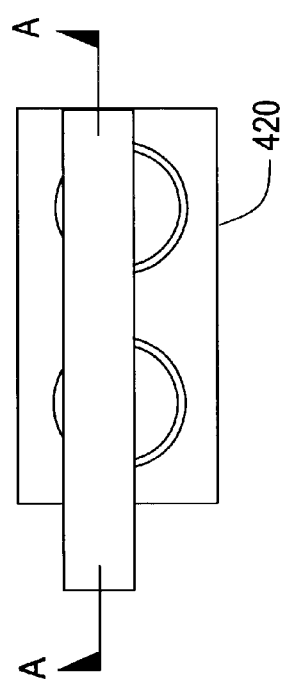
FIG. 19 is a top view of the generator of FIG. 16.
Figure 20:
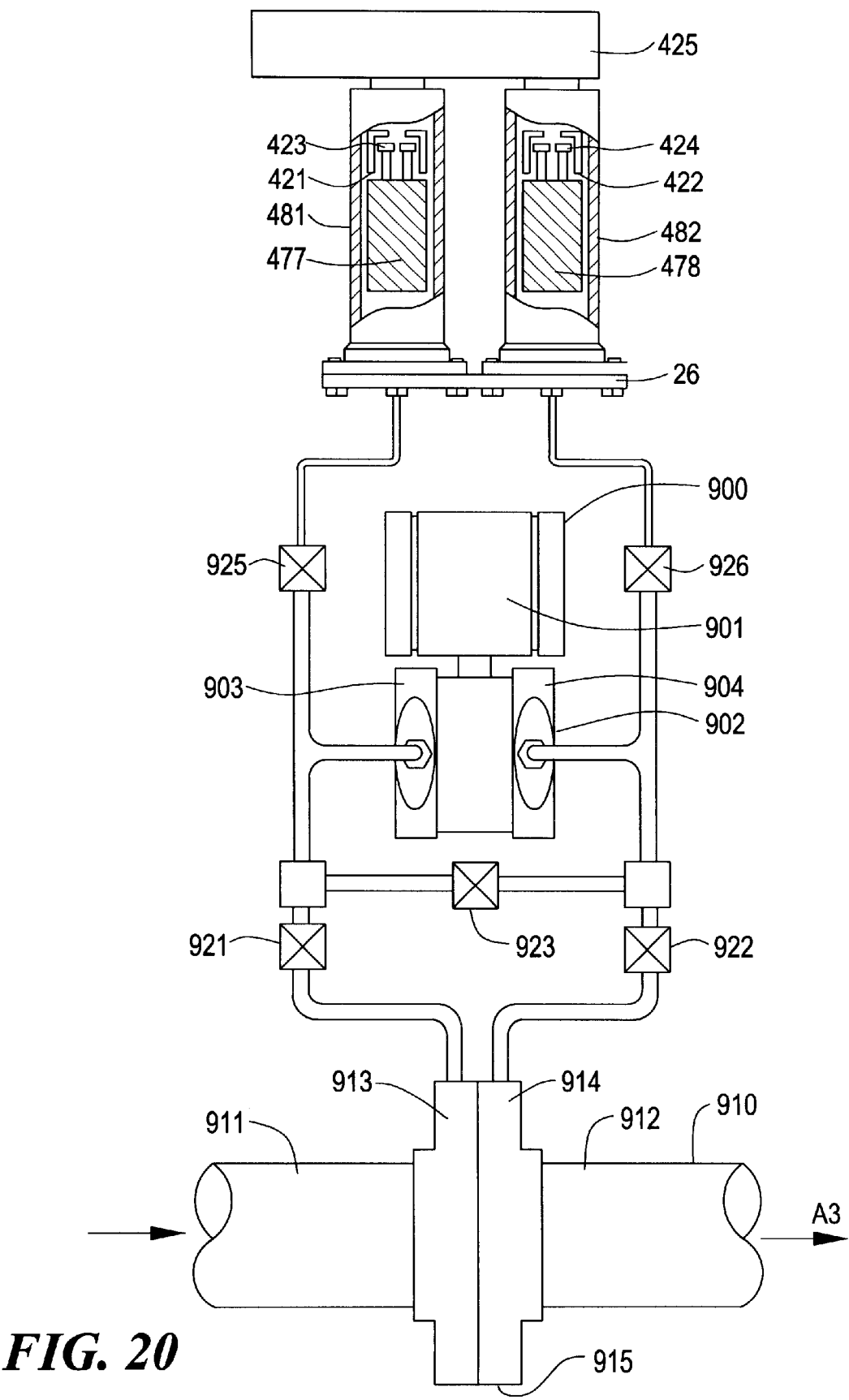
FIG. 20 is a partial cut-away front view of the generator of FIG. 16, mounted for in-situ calibration of a conventional differential pressure sensor measuring across a conventional orifice plate in a process flow line.

FIG. 17 is a sectioned view of the fourth embodiment. FIG. 18 is a side view and FIG. 19 is a top view. FIG. 20 is a partial cut-away front view of the differential pressure generator in a calibration set-up for in-situ calibration of a conventional differential pressure sensor measuring across a conventional orifice plate in a process flow line.

Figure 21:
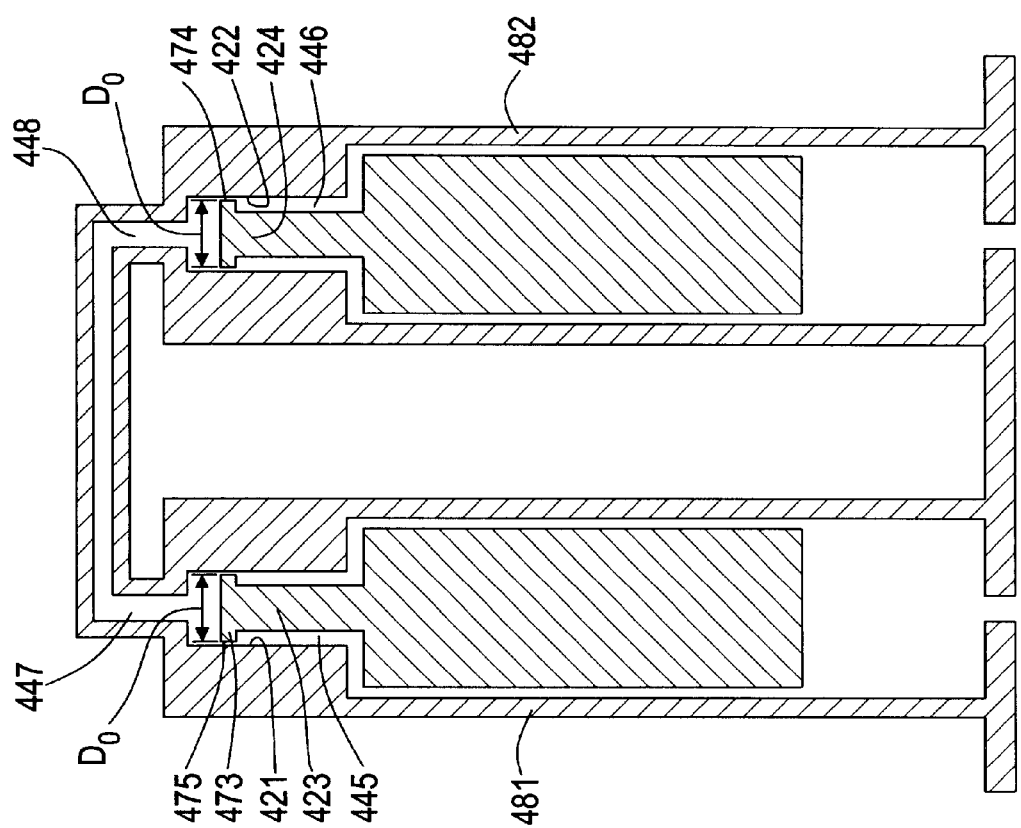
FIG. 21 is a schematic sectioned view of the generator of FIG. 16 showing the pressure generation components.

Referring to FIG. 17, housing 420 of differential pressure generator 400 includes first and second fluid-filled enclosures 481 and 482. The two enclosures are substantially identical and both are filled with fill-fluid 427. A first vertically oriented cylinder 421 is mounted within first enclosure 481. Referring to FIG. 21, first piston ring 473 of piston 423 is located within cylinder 421. A second vertically oriented cylinder 422 is mounted within second enclosure 482. Second piston ring 474 of piston 424 is located within cylinder 422. Within each cylinder, during a period of time while both pistons are falling simultaneously at constant velocity, a pressure is developed between a lower region below the piston and an upper region above the piston. A first pressure is developed between first lower region 445 and first upper region 447. A second pressure is developed between second lower region 446, and a second upper region 448. First upper region 447 is pressure-coupled to second upper region 448. During the period of time while both pistons are falling simultaneously at constant velocity, the pressure between lower regions 445 and 446 represents the accurate differential pressure generated.

As shown in FIG. 17, the accurate differential pressure generated between lower regions 445 and 446 is pressure-coupled by slack diaphragms 443 and 444 to conduits 441 and 442, respectively, and then taken as output via valves 925 and 926. (Valves 925 and 926 are also shown in FIG. 20). First and second fluid enclosure 481 and 482 are filled with fill-fluid 427 above the slack diaphragms. The slack diaphragms and the fill-fluid isolate the pistons and cylinders from process fluid, which might otherwise clog or corrode the moving parts.

FIGS. 16 and 17 show an upper portion of housing 420 defining lifter housing 436. Housing 436. encloses actuating shaft 439 and contains fill-fluid 427. Another upper portion of housing 420 encloses lifter motor 430. This portion is isolated from the lifter housing and is not filled with fill-fluid.

The specific weight of each piston is greater than the specific weight of the fill-fluid. The specific weight of the first piston is greater than the specific weight of the 5 second piston. First piston 423 and second piston 424 each include a weight, weights 477 and 478, respectively. The weights increase the size of the reference differential pressure generated. This is needed to calibrate d/p cells having larger spans.

Figure 23:
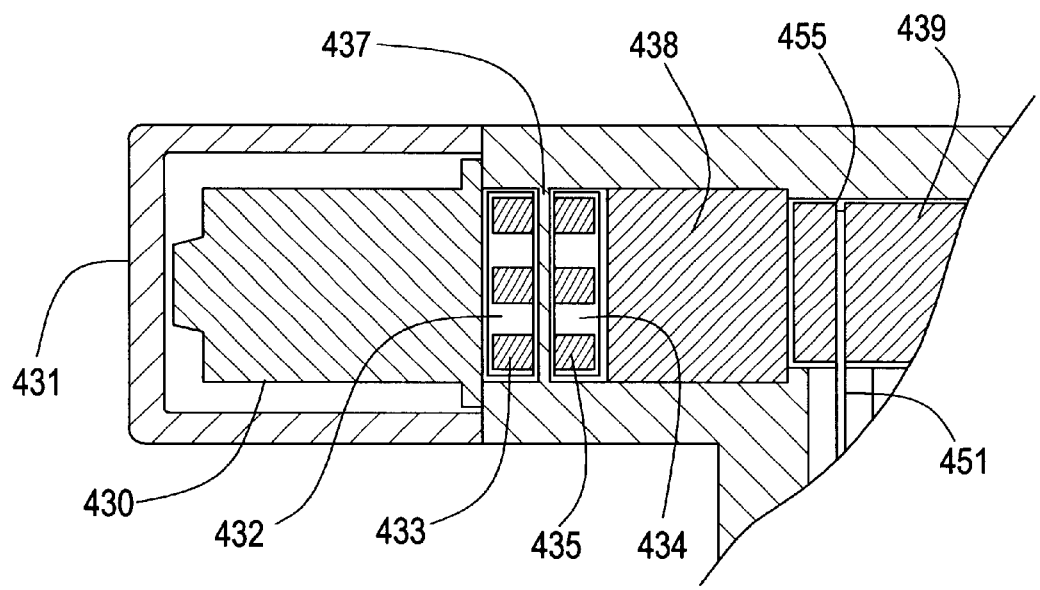
FIG. 23 is a sectioned view of the lifter motor region of the generator of FIG. 16.

Lifter 425 is provided to lift and release both pistons. Pistons 423 and 424 are simultaneously lifted or released by motor 430 of lifter 425 rotating shaft 439. Rotating shaft 439 in one direction winds cables 451 and 452 onto their respective spools to lift the pistons. FIG. 23 shows cable 451 on spool 455.

Figure 22:
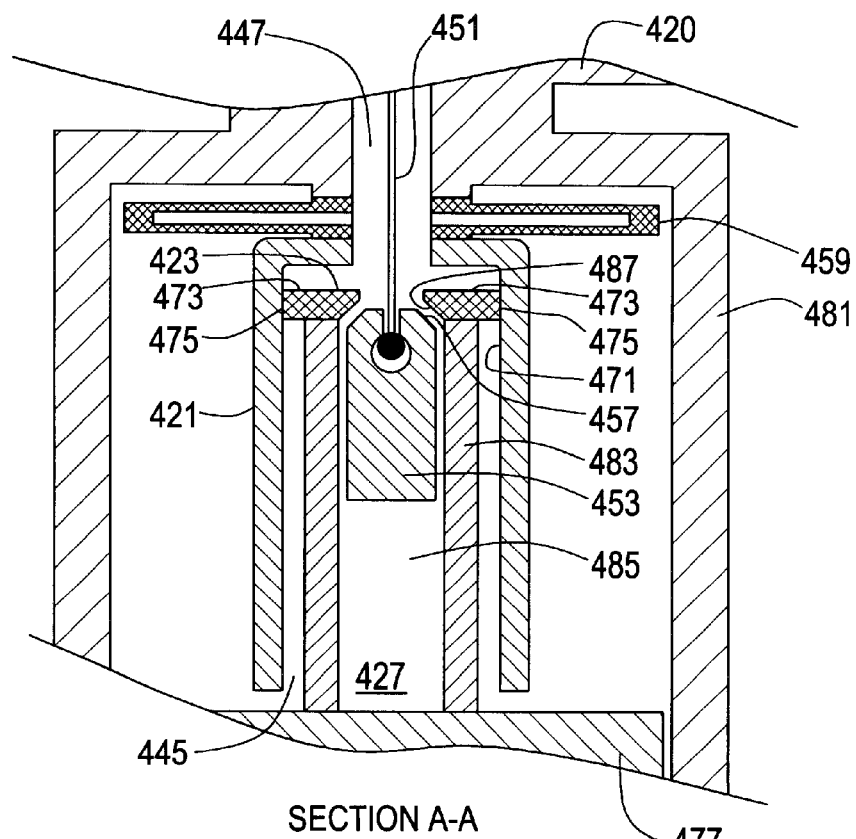
FIG. 22 is a sectioned view of the cylinder region of the generator of FIG. 16.

Also, referring to FIG. 22, first bob 453 at the end of first cable 451 ascends and lifts first piston 423 by engaging first piston hook 487. Pistons 423 and 424 are released by rotating shaft 439 in the other direction to unwind cables 451 and 452. First bob 453 drops rapidly to release first piston hook 487. Bob 453 drops much more rapidly than piston 423 can descend because of its lower flow resistance: the annular gap of bob 453 is much larger than the annular gap between the piston and its cylinder.

As shown in FIG. 17, motor 430 is enclosed in an explosion proof housing 431 with redundant diode protection (not shown) to prevent external arcing. Lifter 425 and its actuating shaft 439 are located within housing 420, which contains fill-fluid 427 at process pressures. Referring now to FIG. 23, isolating barrier 437 provides pressure and fluid isolation for motor 430. Magnetic coupling is used to transfer torque from motor 430 to actuating shaft 439. Motor 430 turns cylindrical coupling plate 432, which includes a circular array of magnets 433. A similar cylindrical coupling plate 434 includes a circular array of magnets 435. The two arrays of magnets provide a strong magnetic coupling across isolating barrier 437. Plate 434 is located within housing 420, which contains fill-fluid 427 at process pressures. Isolating barrier 437 is a non-magnetic material such as stainless steel, and is sufficiently thin to have minimal influence on the magnetic coupling. Torque transferred to plate 434 is applied to the input shaft of a multiple stage planetary gear train item 438. This configuration allows sufficient torque to be transferred through isolating barrier 437 to drive lifter 425.

Still referring to FIG. 17, during the period of time while the pistons descend simultaneously, pressures in lower regions 445 and 446 represent the accurate differential pressure generated. Lower regions 445 and 446 are pressure-coupled to output conduits 441 and 442, respectively. The differential pressure generator output is taken from conduits 441 and 442 via valves 925 and 926.

The preferred embodiment of the differential pressure generator includes a first cylinder 421 and a first piston 423. As shown in FIG. 22, first cylinder 421 defines a first inner cylindrical surface 471. First piston 423 includes first piston ring 473, first weight 477 and first tubular hanger 483. First weight 477 is fixedly attached to and suspended from first tubular hanger 483. First tubular hanger 483 is fixedly attached to and suspended from first piston ring 473. First piston ring 473 defines first outer cylindrical surface 475, which is closely fitted to first inner cylindrical surface 471. The annular gap between an outer cylindrical surface of a piston and the first inner cylindrical surface of its proximal cylinder is sized to ensure restricted flow of fluid and sufficient viscous resistance as to provide a reference differential pressure of sufficiently long duration. The diameter $D_O$ (see FIG. 21) of the outer cylindrical surface 475 is small, i.e., smaller than the inner diameter of first cylinder 421, so as to provide a sufficiently large differential pressure for use in typical applications. Both increasing the weight of the piston, and reducing the effective area of the piston, have the effect of increasing the differential pressure. The effective area of the piston is defined as the area of a circle having a diameter that is halfway between the diameter of the fixed component and the diameter of the falling component. The suspension of weight 477 below piston 423 also helps to maintain the vertical orientation of the piston.

As both pistons descend simultaneously, a data logger monitors and logs the output value of the differential pressure generator as a series of data points, i.e., output values as a function of time. At the end of the descent, logged data points are processed to calculate a preliminary average output value. All data points are then screened to identify suspect data points, i.e., data points that appear to be erroneous. An erroneous data point occurs, for example, when one of the pistons tilts sufficiently to contact the inner surface of its cylinder. A data value significantly different from the preliminary average output value is indicative of a suspect data point. Suspect data points are discarded and the data re-processed to establish a corrected average value. The corrected average value is used to verify or adjust the span calibration of the d/p cell.

The cylinder and the piston are preferably cylindrical. The hollow tube in which the piston moves is named "cylinder" in this disclosure. However, the "cylinder" could have any convenient cross section, such as square or oval, provided the piston is shaped to match.

Piston ring 473 as shown in FIG. 22 is shown as being substantially cylindrical. Thus outer peripheral surface 475 is cylindrical. A cross section transverse to the piston axis has a circular edge, and a cross section parallel to its axis has a straight edge. In another embodiment, outer peripheral surface 475 of piston ring 473 is spherical, i.e., having the shape of a thin slice of the center of a sphere. This shape provides the advantage of maintaining a constant effective area "A" under conditions of slight angular offset from vertical, giving benefit of improved repeatability.

Minimizing the Effects of Process Variables

FIG. 21 illustrates important pressure generation components of the fourth embodiment, first illustrated in FIGS. 16 and 17. These include first cylinder 421, second cylinder 422, first piston 423, and second piston 424. The pistons are enclosed in the fluid that fills the cylinders. The first and second pistons are made to have the same volume. The first piston has a higher specific weight than the second piston, making the first piston side the "high side" because it will generate the higher pressure when it falls. As both pistons descend simultaneously, each at constant velocity, first piston 423 will generate a positive pressure in first lower region 445 with respect to first upper region 447, and second piston 424 will generate a positive pressure in second lower region 446 with respect to second upper region 448.

Figure 27:
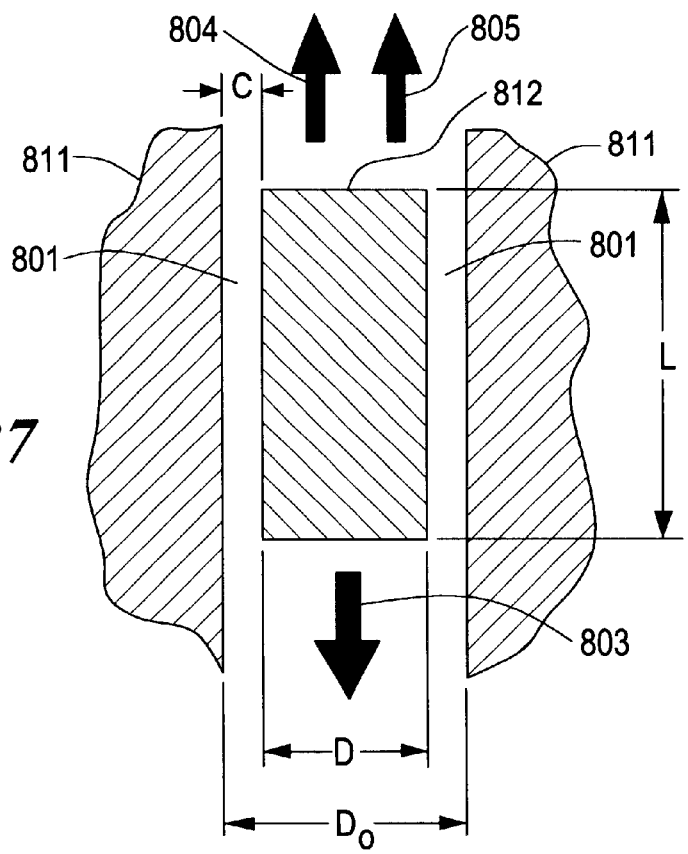
FIG. 27 is a schematic sectioned view of a piston in a cylinder defining an annulus.

As both pistons begin to fall, each accelerates until the forces experienced by the piston are in equilibrium. Thereafter, that piston falls at constant velocity. (The pistons will fall at different constant velocities). Referring to FIG. 27, during the period of time while both pistons are falling simultaneously at constant velocity, the net force on each piston is zero. During this period, the four forces acting on the first piston are: gravitational force FG1, buoyancy force FB1, viscous force FV1 (with friction not considered), and FP1. FP1 is produced by pressure PB1 acting on the bottom of the first piston minus pressure PT1 acting on the top of the first piston both acting on the effective area "A" of the piston. The sum of these four forces is zero. Likewise the sum of forces acting on the second piston, FG2, FB2, FV2, and FP2 is also zero, Thus:

$$FG1+FB1+FV1-(PB1-PT1)*A=0, \text{ and} \quad \text{Eq. 1}$$

$$FG2+FB2+FV2-(PB2-PT2)*A=0. \quad \text{Eq. 2}$$

Rearranging these equations, $$(PB1-PT1)=(FG1+FB1+FV1)/A, \text{ and} \quad \text{Eq. 3}$$

$$(PB2-PT2)=(FG2+FB2+FV2)/A. \quad \text{Eq. 4}$$

Differential pressure DP is the difference of these pressures across the pistons, so $$DP=((FG1+FB1+FV1)/A)-((FG2+FB2+FV2)/A) \quad \text{Eq. 5}$$

$$DP=((FG1-FG2)+(FB1-FB2)+(FV1-FV2))/A \quad \text{Eq. 6}$$

The term (FB1−FB2) is the differential buoyancy, which is zero because it represents the difference in weight of the same volume of the same fluid by the two pistons. Thus the reference differential pressure produced by the generator is independent of fluid specific weight. This reduces the effect of process static pressure and process temperature on the generated differential pressure.

The term (FV1−FV2) is the viscous force. This term is small because it represents the difference between the viscous force on the first piston and the viscous force on the second piston. The term (FV1−FV2) is not zero because the velocity of the first piston is not equal to the velocity of the second piston. Nonetheless, the fact that it is small reduces the effect of process static pressure and process temperature on the generated differential pressure.

Method of Use of the Fourth Embodiment

Figure 29:
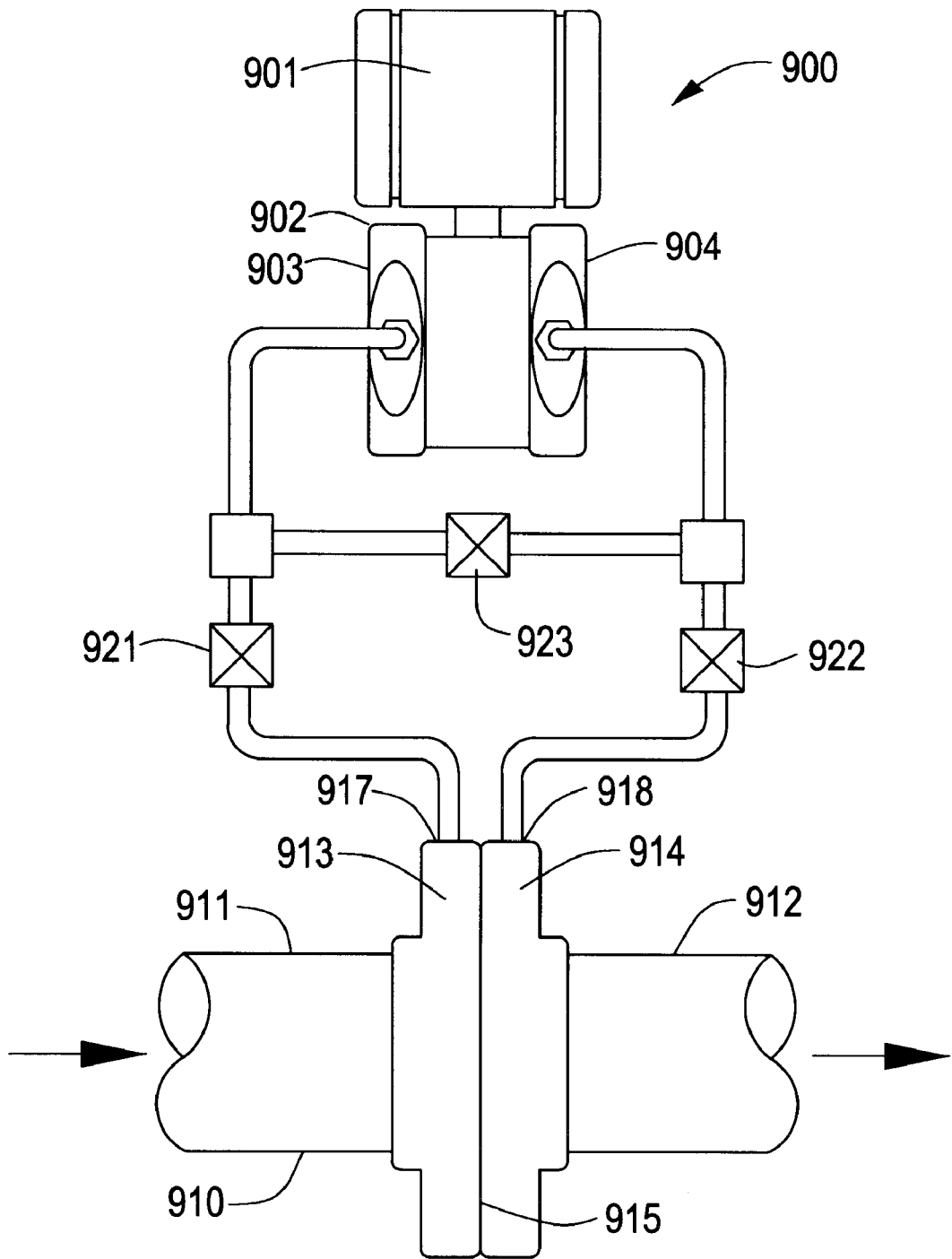
FIG. 29 is a schematic view of a conventional differential pressure sensor, the sensor measuring across a conventional orifice plate in a process flow line.

An intended use of the fourth embodiment is to calibrate a differential pressure orifice plate flow meter (a "d/p cell"). FIG. 29 is a schematic view of a conventional differential pressure transmitter ("d/p cell") 900 measuring across a conventional orifice plate in a process flow line, pipe 910. FIG. 29 shows the d/p cell including housing 901 and manifold 902. The manifold has a high-pressure side 903 and a low-pressure side 904. Upstream and downstream process pipe ends 911 and 912 terminate in flanges 913 and 914, respectively. Orifice plate 915 is mounted between the two flanges. Flanges 913 and 914 include pressure taps 917 and 918, respectively. Valves 921 and 922 are used to isolate the instrument from the process during replacement or zero calibration. Bypass valve 923 is used to equalize the pressures between the high side and the low side of the instrument as needed during calibration.

FIG. 20 is a partial cut-away front view of the generator of FIG. 16, mounted for in-situ calibration of a conventional d/p cell such as that shown in FIG. 29. In normal operation of the d/p cell, the generator is isolated from the d/p cell by valves 925 and 926 being closed.

Referring to FIG. 20, calibration for zero and span includes the following steps.

1. Zero Calibration
   a) open valve 923 to equalize the pressures in the sensor;
   b) close valves 922 and then 921 to isolate the sensor from the process;
   c) adjust the sensor for zero output value.
2. Span Calibration
   a) open valve 923 to equalize the pressures in the sensor;
   b) close valves 922 and then 921 to isolate the sensor from the process;
   c) open valves 925 and 926;
   d) close valve 923 to isolate the sensor input ports from each other;
   e) raise pistons 423 and 424,
   f) release pistons 423 and 424 simultaneously;
   g) monitor sensor output during a period of descent;
   h) test for suspect data point;
   i) discard data point if suspect;
   j) calculate average span output value;
   k) adjust the sensor for calculated average span output value.

After the series of data points has been recorded, the d/p cell is returned to service. Referring to FIG. 20, the d/p cell is returned to service by first closing valves 925 and 926, then opening valve 921, then closing valve 923, and then opening valve 922.

Version of Fourth Embodiment with Process Fluid Pressure Lifter

Figure 24:
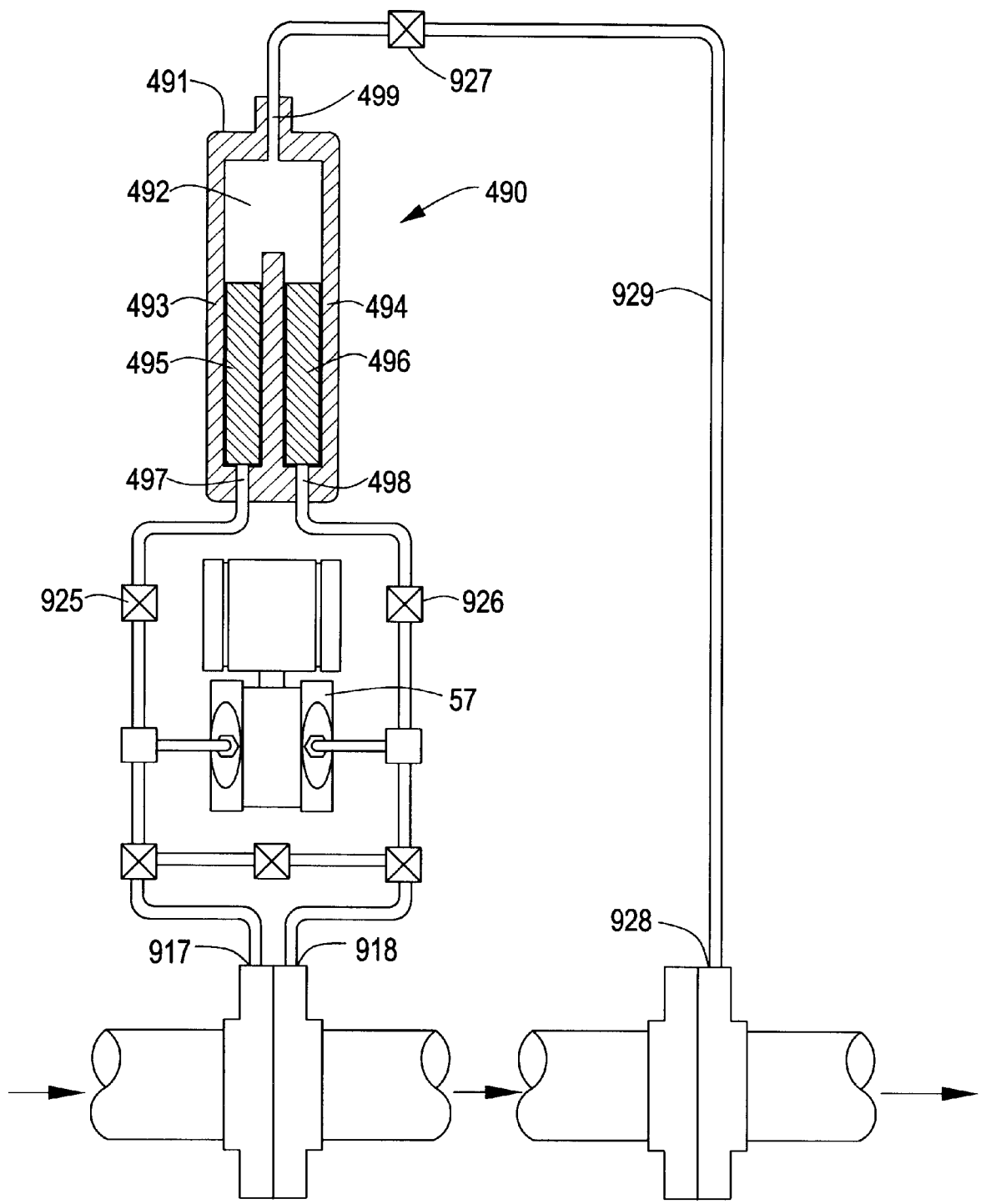
FIG. 24 shows a version of the generator of FIG. 16 without a lifter, wherein process static pressure is used to lift the pistons.

An alternative version 490 of the fourth embodiment is illustrated in FIG. 24. This embodiment uses a difference of static pressure of process fluid in the process line to lift the pistons. Housing 491 of generator 490 includes upper chamber 492 and two vertical bores below chamber 492, the two bores defining first and second cylinders 493 and 494. Housing 491 contains process fluid. First and second pistons 495 and 496 are located within the process fluid in cylinders 493 and 494, respectively. Cylinders 493 and 494 open into first and second lower region exit conduits 497 and 498, respectively. Upper chamber 492 opens into upper region exit conduit 499.

Valve 927 is opened to lift the pistons. The pressure at pressure taps 917 and 918 is greater than the pressure at a suitably located downstream tap 928. So when valve 927 is opened, process fluid from pressure taps 917 and 918 attempts to flow through the cylinders and conduit 929, thereby lifting the pistons.

This embodiment is suitable for use when the process fluid is sufficiently benign that it can be allowed to come into contact with the cylinders and pistons of the differential pressure generator.

Version of Fourth Embodiment with Upright Cup Cylinder

By analogy with second and third embodiments, which include an inverted cup cylinder type and an upright cup cylinder type, respectively, a version of the fourth embodiment (not shown) uses an upright cup cylinder type, the piston falling into the upright cup cylinder.

Fifth Embodiment

FIG. 25 illustrates a differential pressure generator 500 according to the present invention using a single novel gravity transducer of the inverted-cup falling-cylinder type.

Generator 500 includes housing 520 with fluid-filled enclosure 521. Generator 500 also includes one gravity transducer 523 having piston 525 supported by a hollow pillar 530 within the enclosure, and a cylinder 524 having a weight 527. The cylinder is located in enclosure 521 and surrounds piston 525. The cylinder is closed at one end to define chamber 526. The cylinder is mounted in inverted-cup orientation for falling in a gravity-driven, viscosity-limited, motion with respect to the piston. The motion is indicated by arrow A1. The differential pressure generator further includes a first output conduit 522 pressure-coupled to chamber 526, and a second output conduit 528 pressure-coupled to enclosure 521.

Sixth Embodiment

FIG. 26 illustrates a simple differential pressure generator 600 according to the present invention using a single novel gravity transducer of the upright-cup falling-cylinder type.

Generator 600 includes housing 620 with fluid-filled enclosure 621 pressure-coupled to first output conduit 622. Generator 600 also includes one gravity transducer 623 having piston 625 suspended within the enclosure by hollow hanger 630, and a cylinder 624 having a weight 627. The cylinder is located in enclosure 621 and surrounding piston 625. The cylinder is closed at one end to define chamber 626. The cylinder is mounted in upright-cup orientation for falling in a gravity-driven, viscosity-limited, motion with respect to the piston. The motion is indicated by arrow A1. The differential pressure generator further includes a second output conduit 628 pressure-coupled to chamber 626 via drive enclosure 629.

Theory of Operation

Using the fourth embodiment as an example, it will be shown below, the reference differential pressure is independent or substantially independent of the pressure, temperature, specific weight and viscosity of the process fluid. It will also be shown below that some embodiments, suitable for use with benign process fluids, provide the ability to measure the specific weight and the viscosity of the process fluid. In this context "benign process fluids" refers to those process fluids that do not require diaphragms and fill-fluids to isolate the working parts of the differential pressure generator.

As noted above in disclosure of the fourth embodiment, the reference differential pressure is the sum of the pressure in the first lower region and the opposed pressure in the second lower region. The pressure in the lower region of each cylinder is substantially proportional to the gravitational force on the piston minus the buoyant force of the fluid displaced by the piston. Since the two pistons have equal volume, the buoyant forces due to fluid displaced by the piston cancel out. Thus, the predetermined reference differential pressure is substantially independent of fluid specific weight. Viscous drag is a potential source of error but the effect of viscous drag is found to be insignificant. Thus, the predetermined reference differential pressure is independent of the effect of fluid-specific weight variation caused by static pressure and temperature variation, and substantially independent of the effect of fluid viscosity variation due to static pressure and temperature variation.

Figure 28:
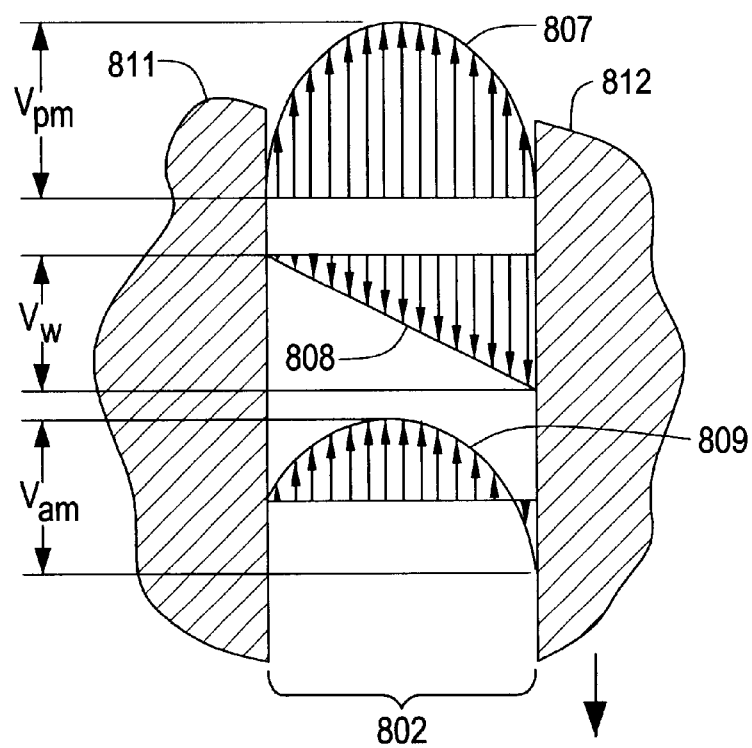
FIG. 28 is a schematic sectioned view of an enlarged portion of the annulus of FIG. 27, showing a set of velocity profiles illustrating fluid flow in the annulus.

FIG. 27 is a schematic sectioned view of piston 812 in a cylinder 811 defining an annulus 801. Each piston is closely fitted within its cylinder. (In FIG. 27 the width of the annulus, i.e., radial clearance, is exaggerated for ease of illustration). FIG. 28 is a schematic sectioned view of an enlarged portion 802 of annulus 801 of FIG. 27, along with a set of velocity profiles illustrating fluid flow in the annulus. In FIG. 28, fluid flow velocity profile 807 is caused by pressure difference across the annulus. Fluid flow velocity profile 808 is caused by velocity of the piston. Fluid flow velocity profile 809 is the result of superimposed flows from pressure difference across the annulus and from velocity of the piston. $V_{pm}$ is the maximum fluid flow velocity caused by pressure difference across the annulus. $V_w$ is the maximum fluid flow velocity caused by velocity of the piston. $V_{am}$ is the maximum velocity difference caused by superimposed flows from pressure difference across the annulus and from velocity of the piston. L is the length of the piston. D is the diameter of the piston. $D_O$ is the diameter of the cylinder.

The two pistons, falling simultaneously, experience gravitational force 803 (down), viscous flow force 804 (up), and buoyant force 805 (up) as indicated by arrows in FIG. 27. These three forces induce the differential pressure output of the differential pressure generator.

Calculating the Differential Pressure Output of the Differential Pressure Generator The differential pressure output (DP) of the differential pressure generator is calculated as follows.

$$DP=(SW_{P1}-SW_{P2})*V*(gl/g)/A \qquad \text{Eq. 7}$$

where $SW_{P1}$ is the specific weight of the first piston;

$SW_{P2}$ is the specific weight of the second piston;

V is the volume of each piston;

A is the effective area of each piston;

g is the standard acceleration due to gravity; and gl is the local gravitation constant.

Specific weights $SW_{P1}$ and $SW_{P2}$ are determined at time of manufacture referred to locations having the standard acceleration of gravity.

Note that all terms are known and constant except for gl. However, gl can be determined to within 0.005% with the following expression by Benedict (1977) as published in "Flow Measurement Engineering Handbook", R. W. Miller, published by McGraw-Hill Book Company, 1983.

$$gl/g=1-(2.637*10-3)*COS\ 2*\phi-(9.6*10-8)*(3.28*y)*10-5 \qquad \text{Eq. 8}$$

where $\phi$=latitude in degrees; and y=altitude in meters above sea level.

Calibrating a Flow Installation

A differential pressure sensor connected across an orifice plate for measurement of flow produces a differential pressure output. Standard equations are used to transform differential pressure outputs into calculated flow values. Such equations are described in Chapter 9 of "Flow Measurement Engineering Handbook", R. W. Miller, published by McGraw-Hill Book Company, 1983.

What is claimed is:

1. A differential pressure generator, comprising:
   a first enclosure containing a first gravity transducer, said first gravity transducer including two first components, one of said first components mounted for gravity-driven, viscosity-limited motion with respect to the other of said first components to generate a first pressure difference;
   a second enclosure attached to said first enclosure, said second enclosure containing a second gravity transducer, said second gravity transducer including two second components, one of said second components mounted for gravity-driven, viscosity-limited motion with respect to the other of said second components to generate a second pressure difference; and
   summing means for summing in opposition said first pressure difference and said second pressure difference to produce a differential pressure.

2. A differential pressure generator according to claim 1, wherein said one of said two first components is equal in displacement volume and is unequal in weight compared to said one of said two second components.

3. A differential pressure generator according to claim 2, wherein said one of said first components is a first falling cylinders and said other of said first components is a first piston; and
   wherein said one of said second components is a second falling cylinder, and said other of said second components is a second piston.

4. A differential pressure generator according to claim 3, wherein said first falling cylinder surrounds said first piston, and said second falling cylinder surrounds second piston such that motion of said first falling cylinder produces said first pressure difference across said first piston, and motion of said second falling cylinder produces said second pressure difference across said second piston.

5. A differential pressure generator according to claim 4, wherein each falling cylinder includes a high-density base portion.

6. A differential pressure generator according to claim 4, wherein each falling cylinder includes a precision cylindrical liner.

7. A differential pressure generator according to claim 4, wherein each piston has a peripheral annular portion with a spherical outer surface.

8. A differential pressure generator according to claim 4, wherein said first and second gravity transducers are stacked such that said first and second cylinders are coaxial.

9. A differential pressure generator according to claim 8, further comprising a lifter coupled to lift and release at least one of said falling cylinders.

10. A differential pressure generator according to claim 9, wherein said lifter includes a magnetic coupler, a gear train, and a translation screw.

11. A differential pressure generator according to claim 4, wherein each of said first and second falling cylinders is a cylinder of the inverted-cup falling-cylinder type.

12. A differential pressure generator according to claim 11,
wherein said summing means includes a first output conduit pressure-coupled to a first chamber defined by said first falling cylinder and said first piston; a second output conduit pressure-coupled to a second chamber defined by said second falling cylinder and said second piston; and a conduit pressure-coupling said first enclosure and said second enclosure.

13. A differential pressure generator according to claim 4, wherein said first and second gravity transducers are mounted side-by-side.

14. A differential pressure generator according to claim 13, further comprising a lifter coupled to lift and release at least one of said falling cylinders, wherein said lifter includes a magnetic coupler, a gear train, and a cable.

15. A differential pressure generator according to claim 4, wherein each of said first and second falling cylinders is a cylinder of the upright-cup falling-cylinder type.

16. A differential pressure generator according to claim 15, wherein said summing means includes a first output conduit pressure-coupled to the first enclosure; a second output conduit pressure-coupled to the second enclosure; and a conduit pressure-coupling a first chamber defined by said first falling cylinder and said first piston and a second chamber defined by said second falling cylinder and said second piston.

17. A differential pressure generator according to claim 1, further comprising a flow source device located within one of said enclosures.

18. A differential pressure generator according to claim 1, further comprising a process fluid isolator including isolation bellows and a process pressure compensator having a large diaphragm plate and a small diaphragm plate.

19. A differential pressure generator according to claim 1, further comprising a process fluid isolator including isolation bellows and an ambient temperature compensator diaphragm assembly with a large bellows and a small bellows.

20. A differential pressure generator according to claim 1, further comprising a process fluid isolator including isolation bellows and an overpressure protector having a spring-loaded disk.

21. A differential pressure generator according to claim 1,
wherein said one of said first components is a first falling piston, and said other of said first components is a first cylinder; and
wherein said one of said second components is a second falling piston, and said other of said second components is a second cylinder;
wherein said first cylinder surrounds said first falling piston, and said second cylinder surrounds second falling piston such that motion of said first falling piston produces said first pressure difference across said first falling piston, and motion of said second falling piston produces said second pressure difference across said second falling piston.

22. A differential pressure generator, comprising:
a fluid-filled enclosure;
a piston mounted within the enclosure;
a cylinder, located in the enclosure surrounding the piston, mounted for falling in a gravity-driven motion relative to the piston; and
a pair of output conduits pressure-coupled to output a pressure difference produced across said piston by said cylinder when falling.

23. A differential pressure generator according to claim 22, wherein the cylinder is mounted in inverted-cup orientation.

24. A differential pressure generator according to claim 23, wherein the piston is mounted on a hollow pillar.

25. A differential pressure generator according to claim 22, wherein the cylinder is mounted in upright-cup orientation.

26. A differential pressure generator according to claim 25, wherein the piston is suspended by a hollow hanger.

27. A method for generating a reference differential pressure, comprising:
enclosing in a first fluid-filled enclosure a first gravity transducer having a first piston-cylinder pair defining a first chamber, a first fixed component, and a first falling component;
enclosing in a second fluid-filled enclosure a second gravity transducer having a second piston-cylinder pair defining, a second chamber, a second fixed component, and a second falling component;
causing first and second falling components to fall simultaneously in fluid, in gravity-driven, viscosity-limited, motion relative to first and second fixed components, respectively, to produce a first pressure difference across a first piston and an opposed second pressure difference across a second piston; and
summing the first pressure difference and the opposed second pressure difference to generate a reference differential pressure.

* * * * *